United States Patent
Lei et al.

(10) Patent No.: US 10,945,294 B2
(45) Date of Patent: Mar. 9, 2021

(54) TRANSMITTING UPLINK CONTROL INFORMATION IN A TWO-STEP RANDOM ACCESS PROCEDURE

(71) Applicant: QUALCOMM Incorporated, San Diego, CA (US)

(72) Inventors: Jing Lei, San Diego, CA (US); Wanshi Chen, San Diego, CA (US); Joseph Binamira Soriaga, San Diego, CA (US); Krishna Kiran Mukkavilli, San Diego, CA (US); Enoch Shiao-Kuang Lu, San Diego, CA (US); Seyong Park, San Diego, CA (US); Yisheng Xue, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/803,888

(22) Filed: Feb. 27, 2020

(65) Prior Publication Data

US 2021/0014898 A1 Jan. 14, 2021

Related U.S. Application Data

(60) Provisional application No. 62/873,511, filed on Jul. 12, 2019.

(51) Int. Cl.
*H04L 12/28* (2006.01)
*H04W 74/08* (2009.01)
(Continued)

(52) U.S. Cl.
CPC ....... *H04W 74/0833* (2013.01); *H04L 1/0004* (2013.01); *H04L 1/1819* (2013.01);
(Continued)

(58) Field of Classification Search
CPC .......... H04W 74/004; H04W 74/0833; H04W 72/0413
(Continued)

(56) References Cited

U.S. PATENT DOCUMENTS

2018/0279297 A1* 9/2018 Nogami ................ H04L 1/1854
2019/0158257 A1* 5/2019 Sano ..................... H04W 72/14
(Continued)

FOREIGN PATENT DOCUMENTS

WO WO-2019019829 A1 1/2019
WO WO-2019021486 A1 1/2019

OTHER PUBLICATIONS

Huawei et al., "Discussion on Channel Structure of 2-Step RACH", 3GPP Draft, 3GPP TSG RAN WG1 Meeting #97, R1-1906050, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019 May 13, 2019 (May 13, 2019), XP051727507, 12 Pages, Retrieved from the Internet: URL:http://www.3gpp.org/ftp/Meetings%5F3GPP%5FSYNC/RAN1/Docs/R1%2D1906050%2Ezip [retrieved on May 13, 2019] paragraph [03.2], paragraph [05.4], figure 7.

(Continued)

*Primary Examiner* — John Pezzlo
(74) *Attorney, Agent, or Firm* — Holland & Hart LLP

(57) ABSTRACT

Methods, systems, and devices for wireless communications are described. A user equipment (UE) may generate an uplink random access message, including a random access preamble and an uplink shared channel resource unit, of a two-step random access procedure. The UE may identify configuration information for uplink control information (UCI) multiplexing. The UE may identify a trigger for inclusion of UCI with the uplink random access message. The UE may multiplex the UCI and a reference signal with (Continued)

the uplink shared channel resource unit and map the uplink control information to resource elements in the uplink shared channel resource unit based on a priority of the uplink control information and a location of resource elements to which the reference signal is mapped. The UE may transmit the uplink random access message comprising the uplink control information and an indication of the used UCI configuration to the base station.

30 Claims, 18 Drawing Sheets

(51) Int. Cl.

| | |
|---|---|
| *H04W 74/00* | (2009.01) |
| *H04W 72/04* | (2009.01) |
| *H04W 72/12* | (2009.01) |
| *H04L 5/10* | (2006.01) |
| *H04L 5/00* | (2006.01) |
| *H04W 76/27* | (2018.01) |
| *H04W 56/00* | (2009.01) |
| *H04L 1/18* | (2006.01) |
| *H04L 1/00* | (2006.01) |
| *H04J 1/16* | (2006.01) |

(52) U.S. Cl.
CPC .......... *H04L 5/0051* (2013.01); *H04L 5/0055* (2013.01); *H04L 5/10* (2013.01); *H04W 56/001* (2013.01); *H04W 72/042* (2013.01); *H04W 72/0413* (2013.01); *H04W 72/1268* (2013.01); *H04W 74/004* (2013.01); *H04W 76/27* (2018.02)

(58) Field of Classification Search
USPC .......................................... 370/252, 329, 535
See application file for complete search history.

(56) References Cited

U.S. PATENT DOCUMENTS

| | | | |
|---|---|---|---|
| 2019/0207737 A1* | 7/2019 | Babaei | H04L 27/2607 |
| 2019/0254074 A1* | 8/2019 | Jeon | H04W 56/001 |
| 2019/0261234 A1* | 8/2019 | Park | H04W 36/0069 |
| 2020/0221503 A1* | 7/2020 | Kusashima | H04W 74/08 |
| 2020/0236669 A1 | 7/2020 | Takeda et al. | |
| 2020/0260300 A1* | 8/2020 | Cirik | H04L 5/0048 |

OTHER PUBLICATIONS

International Search Report and Written Opinion—PCT/US2020/041253—ISA/EPO—dated Sep. 17, 2020 (193673WO).

Nokia et al., "Feature Lead Summary#3 on 2 Step RACH Procedures", 2-Step RACH Procedure Feature Lead Summary RAN1#97, 3GPP TSG RAN WG1 #97, R1-1907900, Reno, USA, May 13, 2019-May 17, 2019, May 17, 2019 (May 17, 2019), pp. 1-59,XP051740159, the whole document.

Qualcomm Incorporated: "Procedures for Two-Step RACH", 3GPP TSG-RAN WG1 Meeting #97, R1-1907256, May 13, 2019-May 17, 2019, Reno, USA, May 17, 2019 (May 17, 2019), pp. 1-13, XP051728696, Retrieved from the Internet: URL: http://www.3gpp.org/ftp/Meetings%5F3GPP%5FSYNC/RAN1/Docs/R1%2D1907256%2Ezip. [retrieved on May 13, 2019], Section 2.

* cited by examiner

TRANSMITTING UPLINK CONTROL INFORMATION IN A TWO-STEP RANDOM ACCESS PROCEDURE

CROSS REFERENCE

The present Application for Patent claims the benefit of U.S. Provisional Patent Application No. 62/873,511 by LEI et al., entitled "TRANSMITTING UPLINK CONTROL INFORMATION IN A TWO-STEP RANDOM ACCESS PROCEDURE," filed Jul. 12, 2019, assigned to the assignee hereof, and expressly incorporated herein.

BACKGROUND

The following relates generally to wireless communications, and more specifically to transmitting uplink control information in a two-step random access procedure.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A UE may perform a random access procedure to establish a Radio Resource Control (RRC) connection with a base station. The random access procedure may be a four-step random access procedure or a two-step random access procedure. In a two-step random access procedure, a UE may send a first uplink message (sometimes referred to as a MsgA) to a base station. The base station may then respond with a second downlink message (also referred to as a MsgB). Options relating to MsgA, or the uplink random access message of a two-step random access procedure, may be further improved.

SUMMARY

The described techniques relate to improved methods, systems, devices, and apparatuses that support transmitting uplink control information (UCI) in a two-step random access procedure. Generally, the described techniques provide for a user equipment (UE) to piggyback UCI onto an uplink random access message of a two-step random access procedure. The uplink random access message may include a random access preamble and a physical resource unit (PRU) for an uplink shared channel. Techniques described herein support a UE multiplexing the UCI onto the PRU for the uplink shared channel. The UE may include UCI in the uplink random access message while in any Radio Resource Control (RRC) state. Additionally, the UE may piggyback the UCI onto the uplink random access message for contention-based two-step random access procedures or contention-free two-step random access procedures.

Techniques for identifying a trigger to include the UCI with the uplink random access message are described. For example, different triggers for including UCI in the uplink random access message are described herein and may be based on an RRC state of the UE, parameter selection of the UE, a type of two-step random access procedure (e.g., contention-based or contention-free procedures), among other conditions or configurations. The UCI may carry one or more types of control information. In some cases, the UCI may be separated or categorized into one or more UCI parts, which may have different priorities. The higher priority UCI parts may be mapped to resource elements which are closer to the reference signals in the PRU. This may lead to a higher likelihood that the higher priority UCI part is decoded correctly by a base station. In some examples, the UE may indicate how many UCI parts are included in the UCI. For example, the UE may indicate the number of UCI parts based on a preamble grouping, a reference signal grouping, a PRU puncturing, or a pointer configuration. Similarly, the UE may indicate whether UCI is included in the uplink random access message at all based on preamble grouping, reference signal group, PRU puncturing, or a combination thereof.

A method of wireless communications is described. The method may include identifying a configuration for multiplexing uplink control information on an uplink random access message of a two-step random access procedure, generating the uplink random access message, the uplink random access message including a random access preamble and associated an uplink shared channel resource unit, identifying a trigger for inclusion of the uplink control information with the uplink random access message, multiplexing the uplink control information and a reference signal with the uplink shared channel resource unit based on the configuration, mapping the uplink control information to resource elements in the uplink shared channel resource unit based on a priority of the uplink control information and a location of resource elements to which the reference signal is mapped, and transmitting the uplink random access message including the uplink control information to a base station.

An apparatus for wireless communications is described. The apparatus may include a processor, memory coupled with the processor, and instructions stored in the memory. The instructions may be executable by the processor to cause the apparatus to identify a configuration for multiplexing uplink control information on an uplink random access message of a two-step random access procedure, generate the uplink random access message, the uplink random access message including a random access preamble and an associated uplink shared channel resource unit, identify a trigger for inclusion of the uplink control information with the uplink random access message, multiplex the uplink control information and a reference signal in the uplink shared channel resource unit based on the configuration, map the uplink control information to resource elements in the uplink shared channel resource unit based on a type of the uplink control information and a location of resource elements to which the reference signal is mapped, and transmit the uplink random access message including the uplink control information to a base station.

Another apparatus for wireless communications is described. The apparatus may include means for identifying a configuration for multiplexing uplink control information on an uplink random access message of a two-step random access procedure, generating the uplink random access message, the uplink random access message including a random access preamble and an associated uplink shared channel resource unit, identifying a trigger for inclusion of the uplink control information with the uplink random access message, multiplexing the uplink control information and a reference signal in the uplink shared channel resource unit based on the configuration, mapping the uplink control information to resource elements in the uplink shared channel resource unit based on a type of the uplink control information and a location of resource elements to which the reference signal is mapped, and transmitting the uplink random access message including the uplink control information to a base station.

A non-transitory computer-readable medium storing code for wireless communications is described. The code may include instructions executable by a processor to identify a configuration for multiplexing uplink control information on an uplink random access message of a two-step random access procedure, generate the uplink random access message, the uplink random access message including a random access preamble and an associated uplink shared channel resource unit, identify a trigger for inclusion of the uplink control information with the uplink random access message, multiplex the uplink control information and a reference signal in the uplink shared channel resource unit based on the configuration, map the uplink control information to resource elements in the uplink shared channel resource unit based on a type of the uplink control information and a location of resource elements to which the reference signal is mapped, and transmit the uplink random access message including the uplink control information to a base station.

Some examples of the method, apparatuses, and non-transitory computer-readable medium described herein may further include operations, features, means, or instructions for identifying a set of uplink control information parts of the uplink control information.

In some examples of the method, apparatuses, and non-transitory computer-readable medium described herein, mapping the uplink control information further may include operations, features, means, or instructions for mapping the set of uplink control information parts to respective resource elements based on respective priorities of the set of uplink control information parts.

In some examples of the method, apparatuses, and non-transitory computer-readable medium described herein, each type of the uplink control information is associated with a priority.

Some examples of the method, apparatuses, and non-transitory computer-readable medium described herein may further include operations, features, means, or instructions for mapping a first uplink control information part with a higher priority closer to resource elements to which the reference signal may be mapped than a second uplink control information part with a lower priority.

In some examples of the method, apparatuses, and non-transitory computer-readable medium described herein, each uplink control information part of the set of uplink control information parts includes a different priority of the uplink control information.

Some examples of the method, apparatuses, and non-transitory computer-readable medium described herein may further include operations, features, means, or instructions for indicating a number of uplink control information parts in the set of uplink control information parts based on a preamble grouping of the random access preamble.

Some examples of the method, apparatuses, and non-transitory computer-readable medium described herein may further include operations, features, means, or instructions for indicating a number of uplink control information parts in the set of uplink control information parts based on a demodulation reference signal (DMRS) grouping.

Some examples of the method, apparatuses, and non-transitory computer-readable medium described herein may further include operations, features, means, or instructions for indicating a number of uplink control information parts in the set of uplink control information parts based on puncturing the uplink shared channel resource unit.

Some examples of the method, apparatuses, and non-transitory computer-readable medium described herein may further include operations, features, means, or instructions for including, in a first uplink control information part, a pointer to a second uplink control information part, where a number of uplink control information parts in the set of uplink control information parts may be indicated based on a number of pointers including at least the pointer.

Some examples of the method, apparatuses, and non-transitory computer-readable medium described herein may further include operations, features, means, or instructions for identifying configuration information for mapping the uplink control information, the configuration information including beta offset information, one or more formats for the uplink control information, a payload size, or any combination thereof.

Some examples of the method, apparatuses, and non-transitory computer-readable medium described herein may further include operations, features, means, or instructions for receiving an indication of the configuration information from the base station, where the configuration information may be identified based on a Radio Resource Control (RRC) state of the UE.

In some examples of the method, apparatuses, and non-transitory computer-readable medium described herein, the indication may be received in a SIB, a an RRC message, or downlink control information.

In some examples of the method, apparatuses, and non-transitory computer-readable medium described herein, the UE may be in an RRC active mode, an RRC idle mode, or an RRC inactive mode.

In some examples of the method, apparatuses, and non-transitory computer-readable medium described herein, the two-step random access procedure may be a contention-free two-step random access procedure or a contention-based two-step random access procedure.

In some examples of the method, apparatuses, and non-transitory computer-readable medium described herein, identifying the trigger further may include operations, features, means, or instructions for receiving a downlink control channel message from the base station, where the inclusion of uplink control information may be based on receiving the downlink control channel message.

In some examples of the method, apparatuses, and non-transitory computer-readable medium described herein, identifying the trigger further may include operations, features, means, or instructions for receiving a group common downlink control channel message from the base station, where the inclusion of uplink control information may be based on receiving the group common downlink control channel message.

In some examples of the method, apparatuses, and non-transitory computer-readable medium described herein, identifying the trigger further may include operations, features, means, or instructions for receiving RRC signaling from the base station, where the inclusion of uplink control information may be based on receiving the RRC signaling.

In some examples of the method, apparatuses, and non-transitory computer-readable medium described herein, identifying the trigger further may include operations, features, means, or instructions for determining the uplink random access message may be a retransmission of an initial uplink random access message.

In some examples of the method, apparatuses, and non-transitory computer-readable medium described herein, the uplink control information includes a redundancy version, a HARQ process identifier, or both.

In some examples of the method, apparatuses, and non-transitory computer-readable medium described herein, identifying the trigger further may include operations, features, means, or instructions for identifying configured sets of resource unit sizes, modulation and coding schemes (MCS), transport block sizes (TBS), or any combination thereof, selecting a resource unit size, an MCS, and a TBS to use for the uplink random access message, and including an indicator of the selected resource unit size, the selected MCS, and the selected TBS in the uplink control information.

In some examples of the method, apparatuses, and non-transitory computer-readable medium described herein, identifying the trigger further may include operations, features, means, or instructions for identifying a configured set of random access occasions, selecting a random access occasion for transmitting the uplink random access message from the configured set of random access occasions, where the random access occasion may be associated with a synchronization signal block (SSB) beam index, and including an indicator of the SSB beam index in the uplink control information.

In some examples of the method, apparatuses, and non-transitory computer-readable medium described herein, identifying the trigger further may include operations, features, means, or instructions for identifying a configured set of random access preambles, selecting the random access preamble from the configured set of random access preambles, where the random access preamble may be associated with a synchronization signal block (SSB) beam index, and including an indicator of the SSB beam index in the uplink control information.

In some examples of the method, apparatuses, and non-transitory computer-readable medium described herein, identifying the trigger further may include operations, features, means, or instructions for performing a measurement on a downlink reference signal from the base station to obtain a downlink measurement, and including an indicator of the downlink measurement in the uplink control information.

In some examples of the method, apparatuses, and non-transitory computer-readable medium described herein, the uplink control information includes uplink shared channel configuration information, acknowledgment (ACK) or negative acknowledgment (NACK) feedback, a CSI report, a scheduling request, interference measurement information, positioning measurement information, reference signal received power (RSRP) measurement information, beam management information, or any combination thereof.

In some examples of the method, apparatuses, and non-transitory computer-readable medium described herein, the uplink shared channel configuration information includes modulation and coding scheme (MCS) information, a redundancy version, a transport block size (TBS), a new data indicator (NDI), a HARQ process number, or any combination thereof.

In some examples of the method, apparatuses, and non-transitory computer-readable medium described herein, the RSRP measurement information may be from a serving cell, one or more neighboring cells, or any combination thereof.

In some examples of the method, apparatuses, and non-transitory computer-readable medium described herein, the beam management information includes a list of preferred beam indexes.

In some examples of the method, apparatuses, and non-transitory computer-readable medium described herein, the beam management information includes transmit beam switching information indicating a first transmit beam for the random access preamble and a second transmit beam for the uplink shared channel resource unit.

In some examples of the method, apparatuses, and non-transitory computer-readable medium described herein, the uplink control information includes acknowledgment (ACK) or negative acknowledgment (NACK) feedback, a CSI report, a scheduling request, or any combination thereof.

Some examples of the method, apparatuses, and non-transitory computer-readable medium described herein may further include operations, features, means, or instructions for indicating that the uplink random access message includes the uplink control information based on a preamble grouping for the random access preamble.

Some examples of the method, apparatuses, and non-transitory computer-readable medium described herein may further include operations, features, means, or instructions for indicating that the uplink random access message includes the uplink control information based on a demodulation reference signal (DMRS) grouping.

Some examples of the method, apparatuses, and non-transitory computer-readable medium described herein may further include operations, features, means, or instructions for indicating that the uplink random access message includes the uplink control information based on puncturing the uplink shared channel resource unit.

A method of wireless communications at a base station is described. The method may include receiving an uplink random access message of a two-step random access procedure, the uplink random access message including a random access preamble and an associated uplink shared channel resource unit, identifying that uplink control information is included in the uplink random access message, identifying a mapping of the uplink control information to resource elements in the uplink shared channel resource unit based on a priority of the uplink control information and a location of resource elements to which a reference signal is mapped, decoding the uplink control information based on the mapping, and decoding the uplink random access message based on the uplink control information.

An apparatus for wireless communications at a base station is described. The apparatus may include a processor, memory coupled with the processor, and instructions stored in the memory. The instructions may be executable by the processor to cause the apparatus to receive an uplink random access message of a two-step random access procedure, the uplink random access message including a random access preamble and an associated uplink shared channel resource unit, identify that uplink control information is included in the uplink random access message, identify a mapping of the uplink control information to resource elements in the uplink shared channel resource unit based on a priority of the uplink control information and a location of resource elements to which a reference signal is mapped, decode the uplink control information based on the mapping, and decode the uplink random access message based on the uplink control information.

Another apparatus for wireless communications at a base station is described. The apparatus may include means for receiving an uplink random access message of a two-step random access procedure, the uplink random access message including a random access preamble and an associated uplink shared channel resource unit, identifying that uplink control information is included in the uplink random access message, identifying a mapping of the uplink control information to resource elements in the uplink shared channel resource unit based on a priority of the uplink control information and a location of resource elements to which a reference signal is mapped, decoding the uplink control information based on the mapping, and decoding the uplink random access message based on the uplink control information.

A non-transitory computer-readable medium storing code for wireless communications at a base station is described. The code may include instructions executable by a processor to receive an uplink random access message of a two-step random access procedure, the uplink random access message including a random access preamble and an associated uplink shared channel resource unit, identify that uplink control information is included in the uplink random access message, identify a mapping of the uplink control information to resource elements in the uplink shared channel resource unit based on a priority of the uplink control information and a location of resource elements to which a reference signal is mapped, decode the uplink control information based on the mapping, and decode the uplink random access message based on the uplink control information.

Some examples of the method, apparatuses, and non-transitory computer-readable medium described herein may further include operations, features, means, or instructions for identifying a set of uplink control information parts of the uplink control information.

Some examples of the method, apparatuses, and non-transitory computer-readable medium described herein may further include operations, features, means, or instructions for identifying a mapping of the set of uplink control information parts to respective resource elements based on respective priorities of the set of uplink control information parts.

Some examples of the method, apparatuses, and non-transitory computer-readable medium described herein may further include operations, features, means, or instructions for identifying that a first uplink control information part with a higher priority may be mapped closer to resource elements to which the reference signal may be mapped than a second uplink control information part with a lower priority.

Some examples of the method, apparatuses, and non-transitory computer-readable medium described herein may further include operations, features, means, or instructions for decoding the first uplink control information part with the higher priority based on the first uplink control information part being mapped closer to resource elements to which the reference signal may be mapped.

In some examples of the method, apparatuses, and non-transitory computer-readable medium described herein, each uplink control information part of the set of uplink control information parts includes a different type of the uplink control information.

Some examples of the method, apparatuses, and non-transitory computer-readable medium described herein may further include operations, features, means, or instructions for identifying a number of uplink control information parts in the set of uplink control information parts based on a preamble grouping for the random access preamble.

Some examples of the method, apparatuses, and non-transitory computer-readable medium described herein may further include operations, features, means, or instructions for identifying a number of uplink control information parts in the set of uplink control information parts based on a demodulation reference signal (DMRS) grouping.

Some examples of the method, apparatuses, and non-transitory computer-readable medium described herein may further include operations, features, means, or instructions for identifying a number of uplink control information parts in the set of uplink control information parts based on puncturing the uplink shared channel resource unit.

Some examples of the method, apparatuses, and non-transitory computer-readable medium described herein may further include operations, features, means, or instructions for identifying, in a first uplink control information part, a pointer to a second uplink control information part, where a number of uplink control information parts in the set of uplink control information parts may be identified based on a number of pointers including at least the pointer.

Some examples of the method, apparatuses, and non-transitory computer-readable medium described herein may further include operations, features, means, or instructions for determining configuration information for mapping the uplink control information, the configuration information including a beta offset, formats for the uplink control information, a payload size, or any combination thereof.

Some examples of the method, apparatuses, and non-transitory computer-readable medium described herein may further include operations, features, means, or instructions for transmitting an indication of the configuration information to the UE based on an RRC state of the UE, where the configuration information may be identified based on receiving the indication.

In some examples of the method, apparatuses, and non-transitory computer-readable medium described herein, the indication may be received in a SIB, a an RRC message, or downlink control information.

In some examples of the method, apparatuses, and non-transitory computer-readable medium described herein, the UE may be in an RRC active mode, an RRC idle mode, or an RRC inactive mode.

In some examples of the method, apparatuses, and non-transitory computer-readable medium described herein, the two-step random access procedure may be a contention-free two-step random access procedure or a contention-based two-step random access procedure.

In some examples of the method, apparatuses, and non-transitory computer-readable medium described herein, identifying that uplink control information may be included in the uplink random access message further may include operations, features, means, or instructions for transmitting a downlink control channel message to the UE, where the downlink control channel message triggers the UE to include the uplink control information in the uplink random access message.

In some examples of the method, apparatuses, and non-transitory computer-readable medium described herein, identifying that uplink control information may be included in the uplink random access message further may include operations, features, means, or instructions for transmitting a group common downlink control channel message to the UE, where the group common downlink control channel message triggers the UE to include the uplink control information in the uplink random access message.

In some examples of the method, apparatuses, and non-transitory computer-readable medium described herein, identifying that uplink control information may be included in the uplink random access message further may include operations, features, means, or instructions for transmitting RRC signaling to the UE, where the RRC signaling triggers the UE to include the uplink control information in the uplink random access message.

In some examples of the method, apparatuses, and non-transitory computer-readable medium described herein, identifying that uplink control information may be included in the uplink random access message further may include operations, features, means, or instructions for determining the uplink random access message may be a retransmission of an initial uplink random access message.

In some examples of the method, apparatuses, and non-transitory computer-readable medium described herein, the uplink control information includes a redundancy version, a HARQ process identifier, or both.

In some examples of the method, apparatuses, and non-transitory computer-readable medium described herein, identifying that uplink control information may be included in the uplink random access message further may include operations, features, means, or instructions for identifying configured sets of resource unit sizes, modulation and coding schemes (MCS), transport block sizes (TBS), or any combination thereof, and identifying, from the UE, an indicator of a selected resource unit size, a selected MCS, and a selected TBS in the uplink control information.

In some examples of the method, apparatuses, and non-transitory computer-readable medium described herein, identifying that uplink control information may be included in the uplink random access message further may include operations, features, means, or instructions for identifying a configured set of random access occasions, where each random access occasion of the configured set of random access occasions may be associated with a synchronization signal block (SSB) beam index, and identifying, from the UE, an indicator of an SSB beam index associated with a random access occasion of the configured set of random access occasions in the uplink control information.

In some examples of the method, apparatuses, and non-transitory computer-readable medium described herein, identifying that uplink control information may be included in the uplink random access message further may include operations, features, means, or instructions for identifying a configured set of random access preambles, where each random access preamble of the configured set of random access preambles may be associated with a synchronization signal block (SSB) beam index, and identifying, from the UE, an indicator of an SSB beam index associated with the random access preamble in the uplink control information.

In some examples of the method, apparatuses, and non-transitory computer-readable medium described herein, identifying that uplink control information may be included in the uplink random access message further may include operations, features, means, or instructions for transmitting a downlink reference signal to the UE, and identifying an indicator of a downlink measurement for the downlink reference signal in the uplink control information.

In some examples of the method, apparatuses, and non-transitory computer-readable medium described herein, the uplink control information includes uplink shared channel configuration information, acknowledgment (ACK) or negative acknowledgment (NACK) feedback, a CSI report, a scheduling request, interference measurement information, positioning measurement information, reference signal received power (RSRP) measurement information, beam management information, or any combination thereof.

In some examples of the method, apparatuses, and non-transitory computer-readable medium described herein, the uplink shared channel configuration information includes modulation and coding scheme (MCS) information, a redundancy version, a transport block size (TB S), a new data indicator (NDI), a HARQ process number, or any combination thereof.

In some examples of the method, apparatuses, and non-transitory computer-readable medium described herein, the RSRP measurement information may be from the base station, one or more neighboring cells of the base station, or any combination thereof.

In some examples of the method, apparatuses, and non-transitory computer-readable medium described herein, the beam management information includes a list of preferred beam indexes.

In some examples of the method, apparatuses, and non-transitory computer-readable medium described herein, the beam management information includes transmit beam switching information indicating a first transmit beam for the random access preamble and a second transmit beam for the uplink shared channel resource unit.

In some examples of the method, apparatuses, and non-transitory computer-readable medium described herein, the uplink control information includes acknowledgment (ACK) or negative acknowledgment (NACK) feedback, a CSI report, a scheduling request, or any combination thereof.

In some examples of the method, apparatuses, and non-transitory computer-readable medium described herein, the identifying that uplink control information may be included in the uplink random access message may be based on a preamble grouping for the random access preamble.

In some examples of the method, apparatuses, and non-transitory computer-readable medium described herein, the identifying that uplink control information may be included in the uplink random access message may be based on a demodulation reference signal (DMRS) grouping.

In some examples of the method, apparatuses, and non-transitory computer-readable medium described herein, the identifying that uplink control information may be included in the uplink random access message may be based on puncturing the uplink shared channel resource unit.

DETAILED DESCRIPTION

Figure 1:
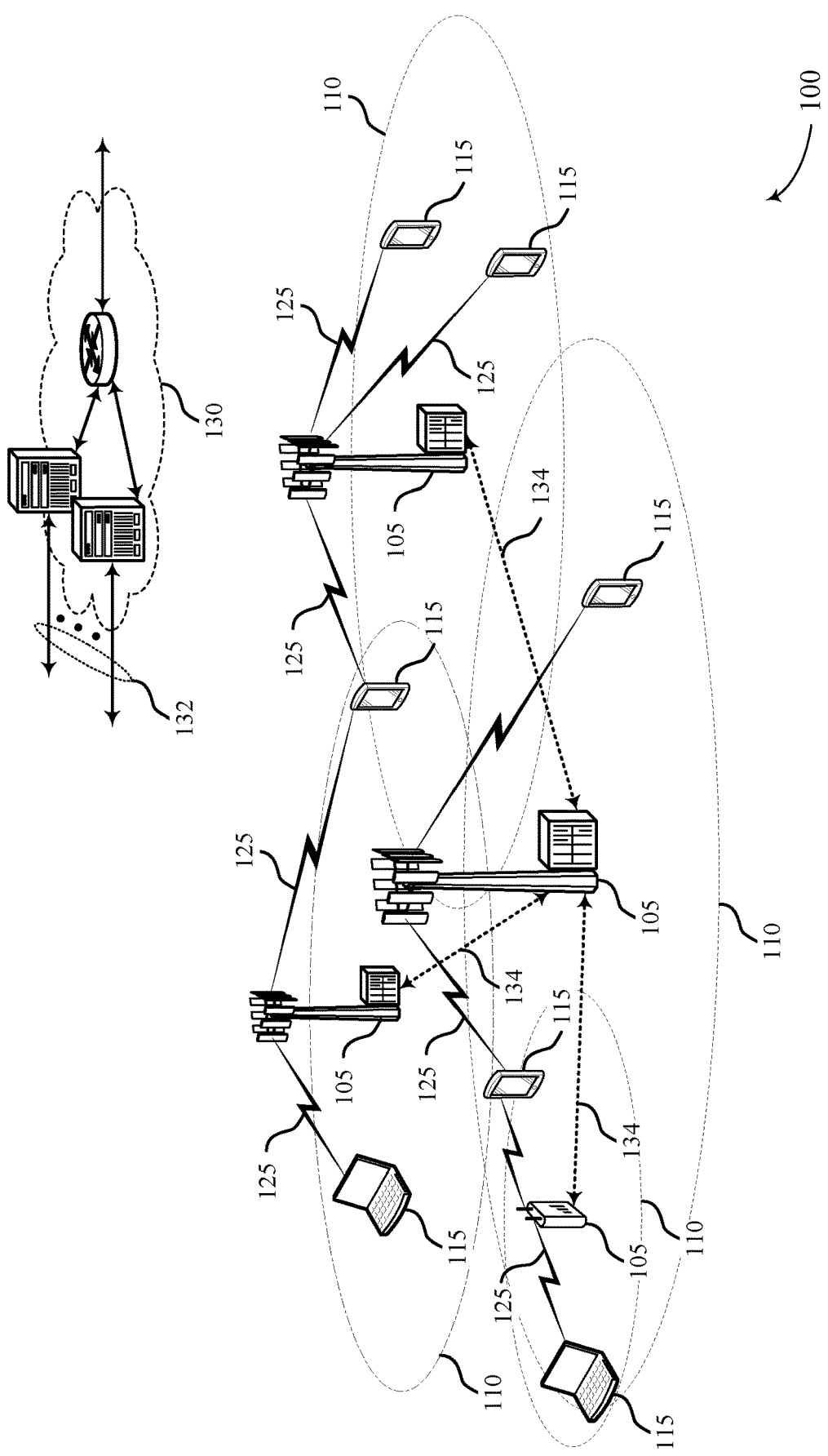
FIG. 1 illustrates an example of a system for wireless communications that supports transmitting uplink control information in a two-step random access procedure in accordance with aspects of the present disclosure.

Some wireless communications systems may support two-step random access procedures. Where a four-step random access procedure includes two, separate uplink transmissions and two, separate downlink transmissions for a user equipment (UE) to establish a Radio Resource Control (RRC) connection with a base station, a two-step random access procedure may establish an RRC connection with two transmissions: an uplink random access message and a downlink random access message. Therefore, a two-step random access procedure may provide benefits of reduced signaling overhead and reduced latency when compared to a four-step random access procedure. The uplink random access message may include a random access preamble and a physical resource unit (PRU) to transmit an RRC connection request over an uplink shared channel. In response to the uplink random access message, a base station may transmit a downlink random access message, including a random access response and an acknowledgment for the RRC connection request. Techniques described herein support a UE to piggyback uplink control information (UCI) onto the uplink random access message. The UCI may be multiplexed with reference signals in the PRU of the uplink random access message. A UE may include UCI in an uplink random access message while in any RRC state. For example, the UE may be in RRC connected mode, RRC inactive mode, or RRC idle mode. Additionally, the UE may piggyback the UCI onto the uplink random access message for contention-based two-step random access procedures or contention-free two-step random access procedures.

In some cases, the UE may be triggered to include the UCI with the uplink random access message. In some cases, the UE may identify some configuration, condition, or situation where including the UCI may assist the base station in decoding the uplink random access message. Different triggers for including UCI in the uplink random access message are described herein.

The UCI may carry one or more types of control information. For example, the UCI may include uplink shared channel configuration information, feedback information, a scheduling request, measurements or measurement information, beam management information, or a combination thereof. In some cases, the UCI may be separated or categorized into one or more UCI parts. In some examples, each UCI part may carry different information. In some cases, the different UCI parts may have different priorities. The higher priority UCI parts may be mapped to resource elements which are closer to the reference signals in the PRU. This may lead to a higher likelihood that the higher priority UCI part is decoded correctly by a base station. In some examples, the UE may indicate how many UCI parts are included in the UCI. For example, the UE may indicate the number of UCI parts based on a preamble grouping, a reference signal grouping, a PRU puncturing, or a pointer configuration. Similarly, the UE may indicate whether UCI is included in the uplink random access message at all based on preamble grouping, reference signal group, PRU puncturing, or a combination thereof.

Aspects of the disclosure are initially described in the context of a wireless communications system. Aspects of the disclosure are further illustrated by and described with reference to apparatus diagrams, system diagrams, and flowcharts that relate to transmitting uplink control information in a two-step random access procedure.

FIG. 1 illustrates an example of a wireless communications system 100 that supports transmitting uplink control information in a two-step random access procedure in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RB s) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may piggyback UCI onto an uplink random access message of a two-step random access procedure. The uplink random access message may include a random access preamble and a PRU for an uplink shared channel. Techniques described herein support a UE 115 to multiplex the UCI onto the PRU for the uplink shared channel. The UE 115 may include UCI in the uplink random access message while in any RRC state. Additionally, the UE 115 may piggyback the UCI onto the uplink random access message for contention-based two-step random access procedures or contention-free two-step random access procedures.

There may be different triggers for the UE 115 to include UCI in the uplink random access message. These triggers may be based on an RRC state of the UE 115, parameters selected by the UE 115, a type of two-step random access procedure (e.g., contention-based or contention-free procedures), among other conditions or configurations. The UCI may carry one or more types of control information. In some cases, the UCI may be separated or categorized into one or more UCI parts, which may have different priorities. The higher priority UCI parts may be mapped to resource elements which are closer to the reference signals in the PRU. This may lead to a higher likelihood that the higher priority UCI part is decoded correctly by a base station 105.

In some examples, the UE 115 may indicate how many UCI parts are included in the UCI. For example, the UE 115 may indicate the number of UCI parts based on a preamble grouping, a reference signal grouping, a PRU puncturing, or a pointer configuration. Similarly, the UE 115 may indicate whether UCI is included in the uplink random access message at all based on preamble grouping, reference signal group, PRU puncturing, or a combination thereof.

Figure 2:
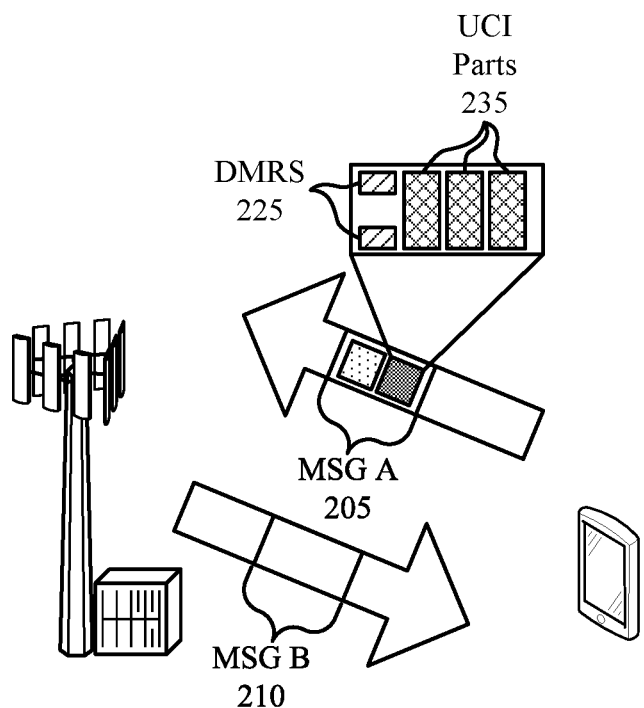
FIG. 2 illustrates an example of a wireless communications system that supports transmitting uplink control information in a two-step random access procedure in accordance with aspects of the present disclosure.
Figure 2:
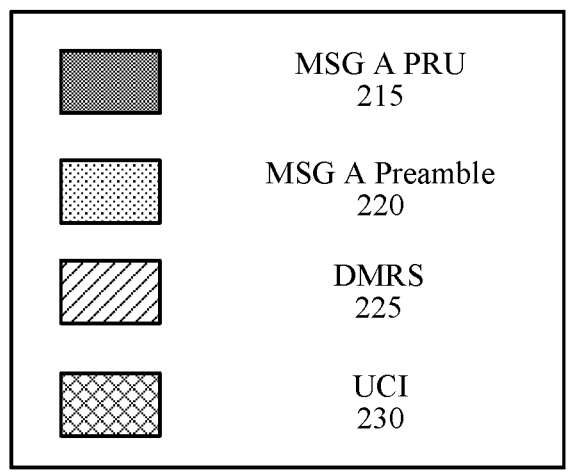

FIG. 2 illustrates an example of a wireless communications system 200 that supports transmitting uplink control information in a two-step random access procedure in accordance with aspects of the present disclosure. In some examples, wireless communications system 200 may implement aspects of wireless communications system 100. The wireless communications system 200 includes UE 115-a and base station 105-a, which may be respective examples of a UE 115 and a base station 105.

UE 115-a and base station 105-a may support two-step random access procedures. Where a four-step random access procedure includes two, separate uplink transmissions (e.g., steps 1 and 3) and two, separate downlink transmissions (e.g., steps 2 and 4) for a UE 115 to establish an RRC connection with a base station 105, a two-step random access procedure may establish an RRC connection with an uplink random access message 205 and a downlink random access message 210. Therefore, a two-step random access procedure may provide benefits of reduced signaling overhead and reduced latency when compared to a four-step random access procedure.

The uplink random access message 205 may include a random access preamble 220 and resources for an uplink shared channel. For example, the uplink random access message may include a RACH preamble and a PUSCH physical resource unit (PRU) 215. In the uplink random access message 205 of a two-step random access procedure, UE 115-a may transmit both a random access preamble 220 (e.g., step one of a four-step random access procedure) and an RRC connection request in the PRU 215 (e.g., step three of a four-step random access procedure). In some cases, the uplink random access message 205 may be referred to as message A, or MsgA.

In response to the uplink random access message 205, base station 105-a may transmit a downlink random access message 210. The downlink random access message 210 of the two-step random access procedure may include a random access response (e.g., step two of a four-step random access procedure) and an acknowledgment for the RRC connection request (e.g., step four of a four-step random access procedure). The downlink random access message 210 may be referred to as message B or MsgB.

In some cases, UE 115-a may include UCI 230 in the uplink shared channel transmission of the uplink random access message 205. For example, UE 115-a may piggyback the UCI 230 onto the PUSCH resources of the PRU 215. The UCI 230 may be multiplexed with the PUSCH message and demodulation reference signals (DMRS) 225 in the PRU 215. Including the UCI 230 may be optional. For example, a UE 115 may transmit an uplink random access message 205 with or without UCI 230. However, including the UCI 230 may provide a UE 115 with some additional flexibility for uplink signaling.

Some systems may support a UE 115 to multiplex uplink control information on PUSCH resources when the UE 115 is in an RRC connected mode. Multiplexing uplink control information on PUSCH resources may be supported for both grant-based and configured-grant transmission when the UE 115 is in the RRC connected mode. The techniques described herein may provide for piggybacking the UCI 230 onto PUSCH resources in the uplink random access message 205 of a two-step random access procedure. Multiplexing the UCI 230 onto the PRU 215 may provide an adjustable tradeoff between flexibility and reduced latency and signaling overhead.

The techniques described herein support UE 115-a to include the UCI 230 in the uplink random access message 205 when in any RRC state. For example, UE 115-a may be capable of multiplexing the UCI 230 onto the PRU 215 when in RRC connected mode, RRC inactive mode, or RRC idle mode. Additionally, UE 115-a may be able to piggyback the UCI 230 onto the uplink random access message 205 for contention-based 2-step random access procedures and contention-free 2-step random access procedures.

In some examples, base station 105-a, or another network device, may configure UE 115-a with a UCI multiplexing configuration. The UCI multiplexing configuration may include the rules, options, formats, etc., for multiplexing the UCI 230 onto the uplink random access message 205. The UCI multiplexing configuration may be indicated in system information (e.g., a system information block), RRC signaling, or downlink control channel signaling (e.g., via DCI). The type of signaling used to indicate the UCI multiplexing configuration may be based on an RRC state of UE 115-a. In some examples, UE 115-a may be configured with the UCI multiplexing configuration prior to starting the two-step random access procedure.

In some cases, UE 115-a may be triggered to include the UCI 230 with the uplink random access message 205. In some cases, UE 115-a may identify some configuration, condition, or situation where including the UCI 230 may assist base station 105-a in decoding the uplink random access message 205. In some cases, the different triggers, or indications of the different triggers, may be included in the UCI multiplexing configuration.

In some cases, such as for a contention-free two-step random access procedure, piggybacked UCI may be triggered by a downlink control channel message. For example, base station 105-a may transmit downlink control information (DCI) to UE 115-a. The DCI may trigger UE 115-a to include UCI 230 in the uplink random access message 205. In contention-free communications, UE 115-a may have dedicated PDCCH resources and dedicated UCI. Therefore, the PDCCH trigger for contention-free two-step random access procedures may be a unicast transmission. In this example, base station 105-a may transmit signaling to trigger UE 115-a (e.g., and just UE 115-a) to include UCI in a uplink random access message 205.

For contention-based two-step random access procedures when UE 115-a is in an RRC connected state, the piggybacked UCI may be triggered by a group-common DCI or via RRC signaling. In contention-based two-step random access procedures, base station 105-a may not be aware of which UE 115 is actually transmitting. Therefore, when triggering UCI piggybacking, base station 105-a may implement some broadcasting techniques to indicate the trigger. In some cases, the broadcast techniques may be indicating the trigger via a group common PDCCH. UE 115-a may receive the group common PDCCH, identify the trigger to include UCI 230 in the uplink random access message 205, then multiplex the UCI 230 in the PRU 215 of the uplink random access message 205.

For contention-based two-step random access procedures when UE 115-a is in an RRC inactive state or an RRC idle state, the trigger to include the UCI 230 may be identified based on one or more conditions. In a first example, UE 115-*a* may identify that the uplink random access message 205 is a retransmission of an initial uplink random access message. UE 115-*a* may then indicate that the uplink random access message 205 is a retransmission to assist base station 105-*a* in determining to perform HARQ combining. In some cases, UE 115-*a* may include a redundancy version, HARQ process ID, or both in the UCI 230. Base station 105-*a* may receive the uplink random access message 205 and identify the UCI 230, including the HARQ process ID, redundancy version, or both. Base station 105-*a* may then use the UCI 230 to perform the HARQ combining.

In a second example, UE 115-*a* may be pre-configured with multiple candidates of PRU size (e.g., for the PRU 215), modulation and coding scheme (MCS), transport block size (TBS), or any combination thereof. In some examples, UE 115-*a* may select a PRU size, MCS, TBS, or a combination thereof. UE 115-*a* may then include an indication of the selected values. By including an indication of the chosen PRU size, MCS, TBS, etc., base station 105-*a* may use the indicated information instead of blindly decoding and trying multiple different values. Therefore, this may reduce the decoding complexity at base station 105-*a*, as base station 105-*a* may otherwise not know what values UE 115-*a* chose. Therefore, if UE 115-*a* selects a PRU size, MCS, or TBS from a preconfigured set, this may trigger UE 115-*a* to include an indication of the selection in the UCI 230.

In a third example, UE 115-*a* may select from multiple random access occasions, from multiple preamble subsets, or both, which may be associated with different synchronization signal block (SSB) beam indexes. In some cases, UE 115-*a* may include an indication of the SSB beam to random access occasion relationship in the UCI 230. For example, UE 115-*a* may include an indication of the SSB beam index which corresponds to the selected random access occasion and preamble subset for the uplink random access message 205. This may reduce blind decoding complexity at base station 105-*a*. Therefore, if UE 115-*a* selects a random access occasion, a preamble, or a preamble subset, this may trigger UE 115-*a* to include an indication of the selection (e.g., or relationship of a received SSB to the selection) in the UCI 230.

In a fourth example, UE 115-*a* may have measurements for downlink signaling, which UE 115-*a* is to report to base station 105-*a*. The measurements may be, for example, reference signal received power (RSRP) measurements, an interference profile, or channel state information (CSI). These downlink measurements may assist base station 105-*a* in scheduling decisions for UE 115-*a*. If UE 115-*a* has taken downlink measurements, this may trigger UE 115-*a* to include the measurements in the uplink random access message 205.

The UCI 230 may carry one or more types of control information. For example, the UCI 230 may include uplink shared channel configuration information. In some cases, the uplink shared channel configuration information may include, for example, an MCS, an RV, a TBS, a new data indicator (NDI), a HARQ process number, or any combination thereof. In some cases, the UCI 230 may include acknowledgement (ACK) or negative acknowledgment (NACK) feedback (e.g., HARQ feedback), a CSI report, or a scheduling request. In some cases, the bit-width for the ACK/NACK feedback, CSI report, or scheduling request may be configurable. In some cases, the UCI 230 may include interference measurements or positioning-related measurements. In some examples, the UCI 230 may include RSRP measurements from the serving cell (e.g., base station 105-*a*) or from neighboring cells. The RSRP measurements may be an example of level 1 RSRP measurements. The RSRP measurements may have a configurable bit-width. In some cases, the UCI 230 may include beam management information. For example, the beam management information may include a list of preferred SSB or CSI-RS beam indexes. In some cases, the beam management information may include transmit beam switching information between the MsgA preamble and the MsgA PUSCH (e.g., between the random access preamble 220 and the PRU 215). In some examples, the UCI 230 multiplexed on the PRU 215 may have its own UCI format.

In some cases, the UCI 230 may be broken into one or more UCI parts 235. Each UCI part 235 may carry different information. For example, a first UCI part 235 may carry ACK/NACK feedback, a second UCI part 235 may carry PUSCH configuration information, and a third UCI part 235 may carry beam management information.

In some cases, the different UCI parts 235 may have different priorities. For example, one UCI part 235 may a higher priority than the other UCI parts 235. The higher priority UCI parts 235 may be mapped to resource elements which are closer to the DMRS 225 in the PRU 215. This may lead to a higher likelihood that the higher priority UCI part 235 is decoded correctly by base station 105-*a*. Some additional examples of UCI mapping are described with reference to FIG. 3.

In some examples, UE 115-*a* may indicate how many UCI parts 235 make up the UCI 230. For example, the UCI 230 may include three UCI parts 235, and UE 115-*a* may indicate to base station 105-*a* that there are three UCI parts 235. In some cases, UE 115-*a* may indicate the number of UCI parts 235 based on a preamble grouping.

For example, if UE 115-*a* uses an odd preamble index, there may be just one UCI part 235. If UE 115-*a* uses an odd preamble index, this may indicate that there are two UCI parts. Other techniques for indicating the number of UCI parts via preamble grouping may be supported as well (e.g., based on modulo operations, etc.). In some cases, UE 115-*a* may indicate the number of UCI parts 235 based on DMRS grouping. For example, an odd DMRS port index may be associated with single-part UCI, where an even DMRS port index may be associated with two-port UCI. In some examples, UE 115-*a* may indicate the number of UCI parts based on PUSCH puncturing. For example, UE 115-*a* may puncture one or two resource elements for MsgA PUSCH mapping. The time and frequency locations of the punctured resource elements may be semi-static, which may be indicated in system information or signaled by RRC.

In some cases, UE 115-*a* may indicate the number of UCI parts 235 based on a pointer configuration. For example, a chain table may be configured between different UCI parts 235. A first UCI part 235 may include a pointer to the next UCI part 235. For example, UCI part X may include a pointer to UCI part X+1. Therefore, as long as a UCI part has a pointer, base station 105-*a* may determine that there are at least X+1 pointers. When a UCI part 235 does not have a pointer, base station 105-*a* may be able to determine how many UCI parts 235 make up the UCI 230.

UE 115-*a* may include an indication of whether the uplink random access message 205 includes the UCI 230 at all. For example, inclusion of the UCI 230 may be optional or configurable, or the UCI 230 may not always be triggered to be included in the uplink random access message 205. Therefore, UE 115-*a* may indicate whether the uplink random access message 205 includes the UCI 230. In some cases, the inclusion of UCI 230 may be indicated by a preamble grouping, a DMRS grouping, a PUSCH puncturing, or any combination thereof. The preamble grouping, DMRS grouping, and PUSCH puncturing indications may be similar to those above described with reference to indicating a number of UCI parts 235.

Figure 3:
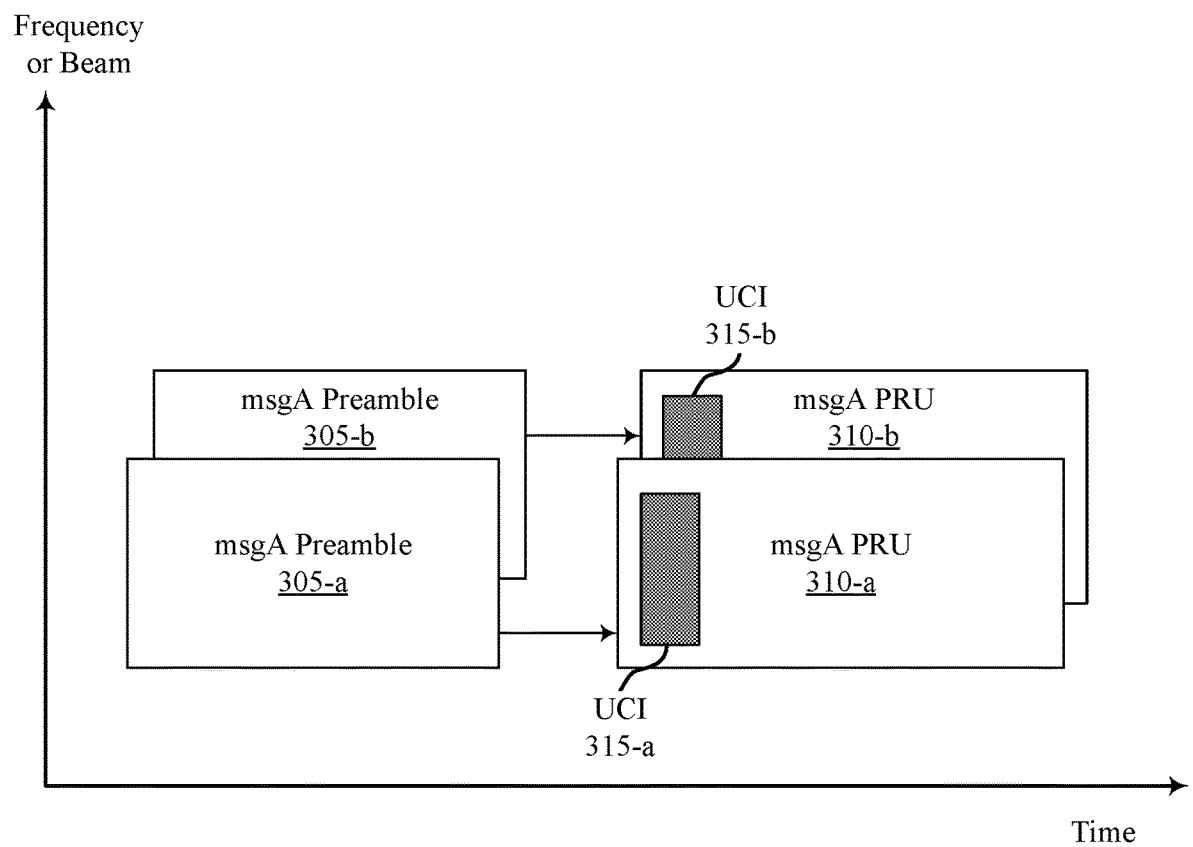
FIG. 3 illustrates an example of a resource mapping configuration that supports transmitting uplink control information in a two-step random access procedure in accordance with aspects of the present disclosure.

FIG. 3 illustrates an example of a resource mapping configuration 300 that supports transmitting uplink control information in a two-step random access procedure in accordance with aspects of the present disclosure. In some examples, the resource mapping configuration 300 may implement aspects of wireless communications system 100.

As described herein, a UE 115 may be configured for a two-step random access procedure. In a first message of the two-step random access procedure, a UE 115 may transmit a preamble 305 and an uplink shared channel message in a shared channel PRU 310. UEs 115 described herein may implement techniques to multiplex UCI 315 on the PRU 310, including, or piggybacking, the UCI 315 in the uplink random access message.

In some cases, multiple UEs 115 configured for two-step random access procedures may share the same time, frequency, or beam resources to transmit piggybacked UCI 315. The UEs 115 sharing the same PUSCH time, frequency, and beam resources may be configured with a number of UCI parts (e.g., 0 parts, 1 part, 2 parts, 3 parts, etc.). In some cases, the number of UCI parts for the UEs 115 sharing the resources may be the same or different. For example, a first UE 115 may transmit preamble 305-*a* and UCI 315-*a* in PRU 310-*a*. A second UE 115 may transmit preamble 305-*b* and UCI 315-*b* in PRU 310-*b*. UCI 315-*a* and UCI 315-*b* may at least partially overlap in time, frequency, and beam resources.

When multi-part UCI is supported, the UCI parts may be classified into different priorities. The UCI parts may then be mapped to resource elements based on their respective priorities. For example, higher priority UCI parts may be mapped to resource elements which are to DMRS resource elements. This may increase the likelihood that the high priority UCI parts are successfully decoded by the receiver (e.g., a base station 105). In some cases, this may also mitigate possible interference from other UEs 115 which may share the same resources for two-step random access procedures. In some cases, based on the RRC state of a UE 115, the configuration information for UCI piggybacking (e.g., beta offsets, formats, payload size, etc.) may be indicated in system information, signaled by RRC, or signaled by DCI.

Figure 4:
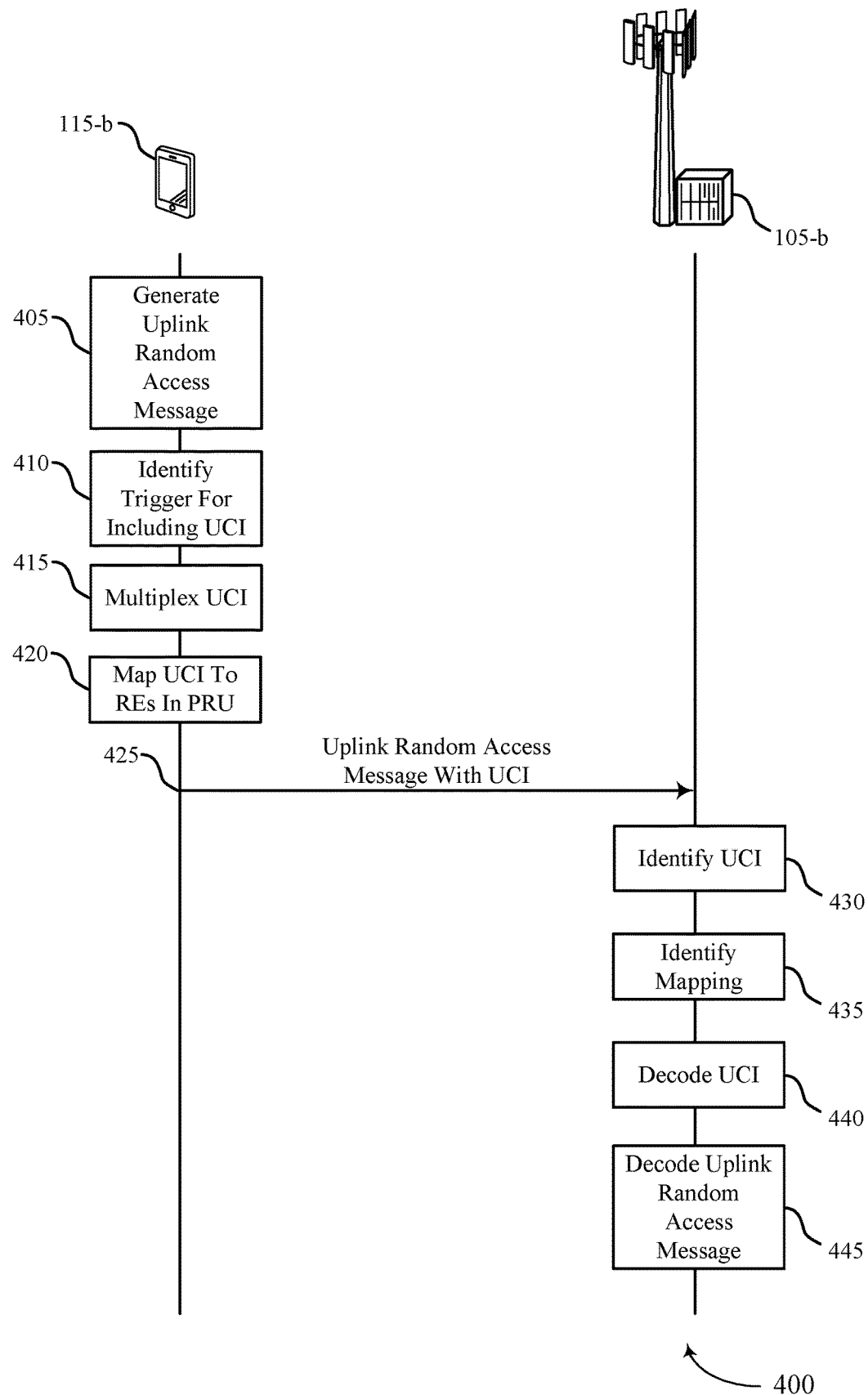
FIG. 4 illustrates an example of a process flow that supports transmitting uplink control information in a two-step random access procedure in accordance with aspects of the present disclosure.

FIG. 4 illustrates an example of a process flow 400 that supports transmitting uplink control information in a two-step random access procedure in accordance with aspects of the present disclosure. In some examples, process flow 400 may implement aspects of wireless communications system 100. Process flow 400 may include UE 115-*b* and base station 105-*b*, which may be respective examples of a UE 115 and a base station 105 described herein.

UE 115-*b* may identify a configuration for multiplexing UCI on an uplink random access message of a two-step random access procedure. In some cases, UE 115-*b* may receive the configuration for multiplexing UCI from the network, such as from base station 105-*b*. Base station 105-*b* may transmit the configuration via DCI, RRC signaling, or system information. In some cases, the signaling used to indicate the configuration for multiplexing UCI may be based on an RRC state of UE 115-*b*. For example, if in an RRC connected state, UE 115-*b* may receive the configuration for multiplexing UCI via DCI.

At 405, UE 115-*b* may generate an uplink random access message of the two-step random access procedure, the uplink random access message including a random access preamble and an uplink shared channel resource unit. The uplink random access message may be an example of a MsgA as described herein. The uplink shared channel resource unit may be an example of a PUSCH PRU.

At 410, UE 115-*b* may identify a trigger for inclusion of UCI with the uplink random access message. Generally, UE 115-*b* may be triggered to include UCI with the uplink random access message if the inclusion of the UCI decreases decoding complexity for base station 105-*b*. Additionally, or alternatively, UE 115-*b* may be triggered to include UCI if the inclusion of the UCI improves scheduling decisions of base station 105-*b*. In some cases, identifying the trigger is based on receiving a downlink control channel message from base station 105-*b*, where the inclusion of the UCI is based on receiving the downlink control channel message. In some cases, identifying the trigger is based on receiving a group common downlink control channel message from base station 105-*b*, wherein the inclusion of UCI is based on receiving the group common downlink control channel message. In some examples, UE 115-*b* may receive RRC signaling from base station 105-*b*, which may trigger the inclusion of UCI in the uplink random access message. In some cases, UE 115-*b* may identify the trigger based on determining the uplink random access message a retransmission of an initial uplink random access message. In some examples, UE 115-*b* may select a resource unit size, an MCS, a TBS, or any combination thereof, from preconfigured sets, where the UCI is triggered to be included in the uplink random access message based on UE 115-*b* making the selection. Other examples of triggers are described herein and may be described in more detail with respect to FIG. 2.

In some cases, the UCI may include one or more UCI parts. UE 115-*b* may identify a set of UCI parts of the UCI. In some cases, each of the UCI parts may include different types of UCI. In some examples, each of the different UCI parts may have, or may be assigned, a different priority. For example, a UCI part including high priority control information may be considered a high priority UCI part.

At 415, UE 115-*b* may multiplex the UCI and a reference signal with the uplink shared channel resource unit. A DMRS may be an example of the reference signal. In some cases, UE 115-*b* may multiplex one or more reference signals in the uplink shared channel resource unit.

At 420, UE 115-*b* may map the UCI to resource elements in the uplink shared channel resource unit based on a priority of the uplink control information and a location of resource elements to which the reference signal is mapped. For example, higher priority UCI may be mapped closer to resource elements to which the reference signal is mapped. This may lead to a higher likelihood of the higher priority UCI being successfully decoded by base station 105-*b*. In some cases, UE 115-*b* may map high priority UCI parts closer to resource elements to which the reference signal is mapped.

At 425, UE 115-*b* may transmit the uplink random access message including the uplink control information to base station 105-*b*. Base station 105-*b* may receive the uplink random access message At 430, base station 105-*b* may identify that uplink control information is included in the uplink random access message. At 435, base station 105-*b* may identify a mapping of the UCI to resource elements in the uplink shared channel resource unit based on a priority of the UCI and a location of resource elements to which a reference signal is mapped. Base station 105-*b* may decode the UCI based on the mapping at 440. At 445, base station 105-b may decode the uplink random access message based on the UCI. In some cases, the UCI may include information which assists base station 105-b in decoding the uplink random access message. For example, the UCI may include an RV, HARQ process, or both, if the uplink random access message is a retransmission. In some cases, the UCI may include an MCS, a TBS, a resource unit size, etc., which may improve blind decoding performance at base station 105-b.

Figure 5:
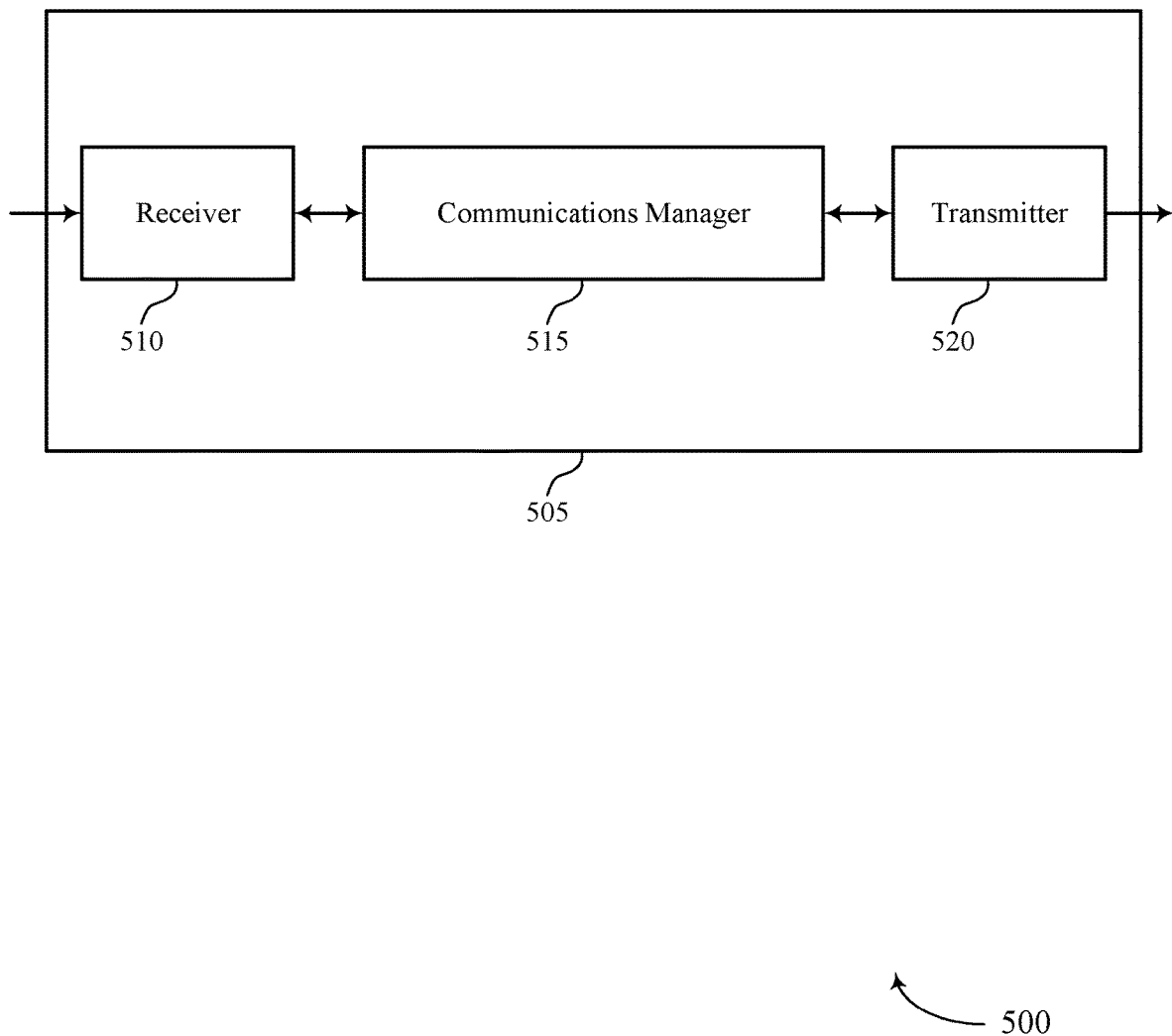
FIGS. 5 and 6 show block diagrams of devices that support transmitting uplink control information in a two-step random access procedure in accordance with aspects of the present disclosure.

FIG. 5 shows a block diagram 500 of a device 505 that supports transmitting uplink control information in a two-step random access procedure in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to transmitting uplink control information in a two-step random access procedure, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify a configuration for multiplexing uplink control information on an uplink random access message of a two-step random access procedure, generate the uplink random access message, the uplink random access message including a random access preamble and an associated uplink shared channel resource unit, identify a trigger for inclusion of the uplink control information with the uplink random access message, multiplex the uplink control information and a reference signal in the uplink shared channel resource unit based on the configuration, map the uplink control information to resource elements in the uplink shared channel resource unit based on a type of the uplink control information and a location of resource elements to which the reference signal is mapped, and transmit the uplink random access message including the uplink control information to a base station. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the UE communications manager 515 as described herein may be implemented to realize one or more potential advantages. One implementation may allow a UE 115 to have increased signaling flexibility. These techniques support a UE 115 to include UCI in a RACH message while operating in any RRC state. In some cases, the UE 115 may transmit measurement information which may assist a base station 105 in making scheduling decisions for the UE 115. This may lead to improved scheduling and communications quality for the UE 115. These techniques may also provide benefits for a base station 105. UCI included in the uplink random access message may improve decoding performance at the base station 105.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
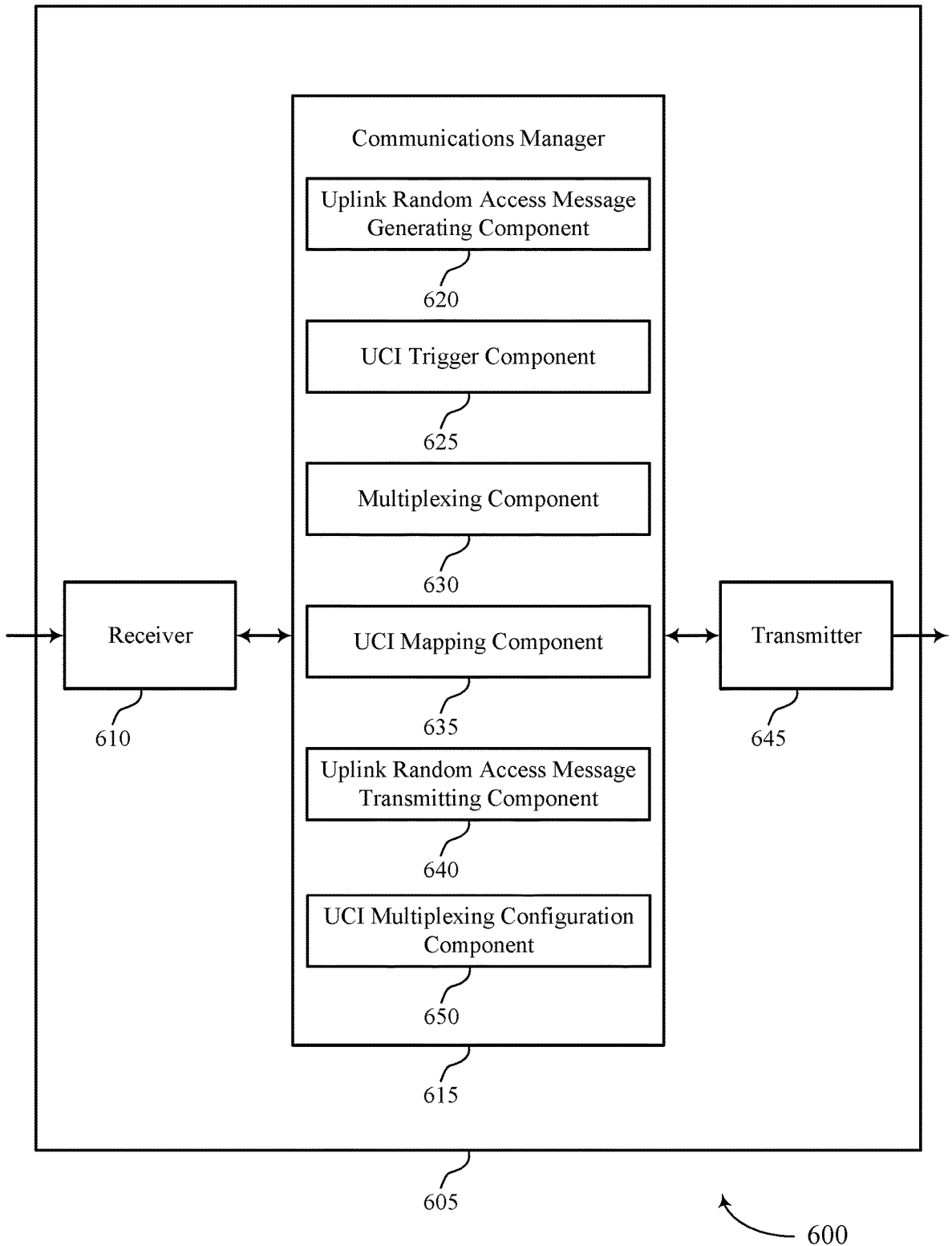

FIG. 6 shows a block diagram 600 of a device 605 that supports transmitting uplink control information in a two-step random access procedure in accordance with aspects of the present disclosure. The device 605 may be an example of aspects of a device 505, or a UE 115 as described herein. The device 605 may include a receiver 610, a communications manager 615, and a transmitter 645. The device 605 may also include a processor. Each of these components may be in communication with one another (e.g., via one or more buses).

The receiver 610 may receive information such as packets, user data, or control information associated with various information channels (e.g., control channels, data channels, and information related to transmitting uplink control information in a two-step random access procedure, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an uplink random access message generating component 620, a UCI trigger component 625, a multiplexing component 630, a UCI mapping component 635, an uplink random access message transmitting component 640, and a UCI multiplexing configuration component 650. The communications manager 615 may be an example of aspects of the communications manager 810 described herein.

The UCI multiplexing configuration component 650 may identify a configuration for multiplexing uplink control information on an uplink random access message of a two-step random access procedure. The uplink random access message generating component 620 may generate the uplink random access message, the uplink random access message including a random access preamble and an associated uplink shared channel resource unit. The UCI trigger component 625 may identify a trigger for inclusion of the uplink control information with the uplink random access message. The multiplexing component 630 may multiplex the uplink control information and a reference signal in the uplink shared channel resource unit based on the configuration. The UCI mapping component 635 may map the uplink control information to resource elements in the uplink shared channel resource unit based on a type of the uplink control information and a location of resource elements to which the reference signal is mapped. The uplink random access message transmitting component 640 may transmit the uplink random access message including the uplink control information to a base station.

Based on piggybacking UCI onto an uplink random access message, a processor of a UE 115 (e.g., controlling the receiver 610, the transmitter 645, or the transceiver 820 as described with reference to FIG. 8) may flexibly transmit UCI to a base station 105. The UCI may be received at the base station 105, and the base station 105 may make adjustments based on the UCI. For example, the UCI may include measurement information, scheduling requests, beam management information, etc., which may lead to enhance communications for the UE 115.

The transmitter 645 may transmit signals generated by other components of the device 605. In some examples, the transmitter 645 may be collocated with a receiver 610 in a transceiver module. For example, the transmitter 645 may be an example of aspects of the transceiver 820 described with reference to FIG. 8. The transmitter 645 may utilize a single antenna or a set of antennas.

Figure 7:
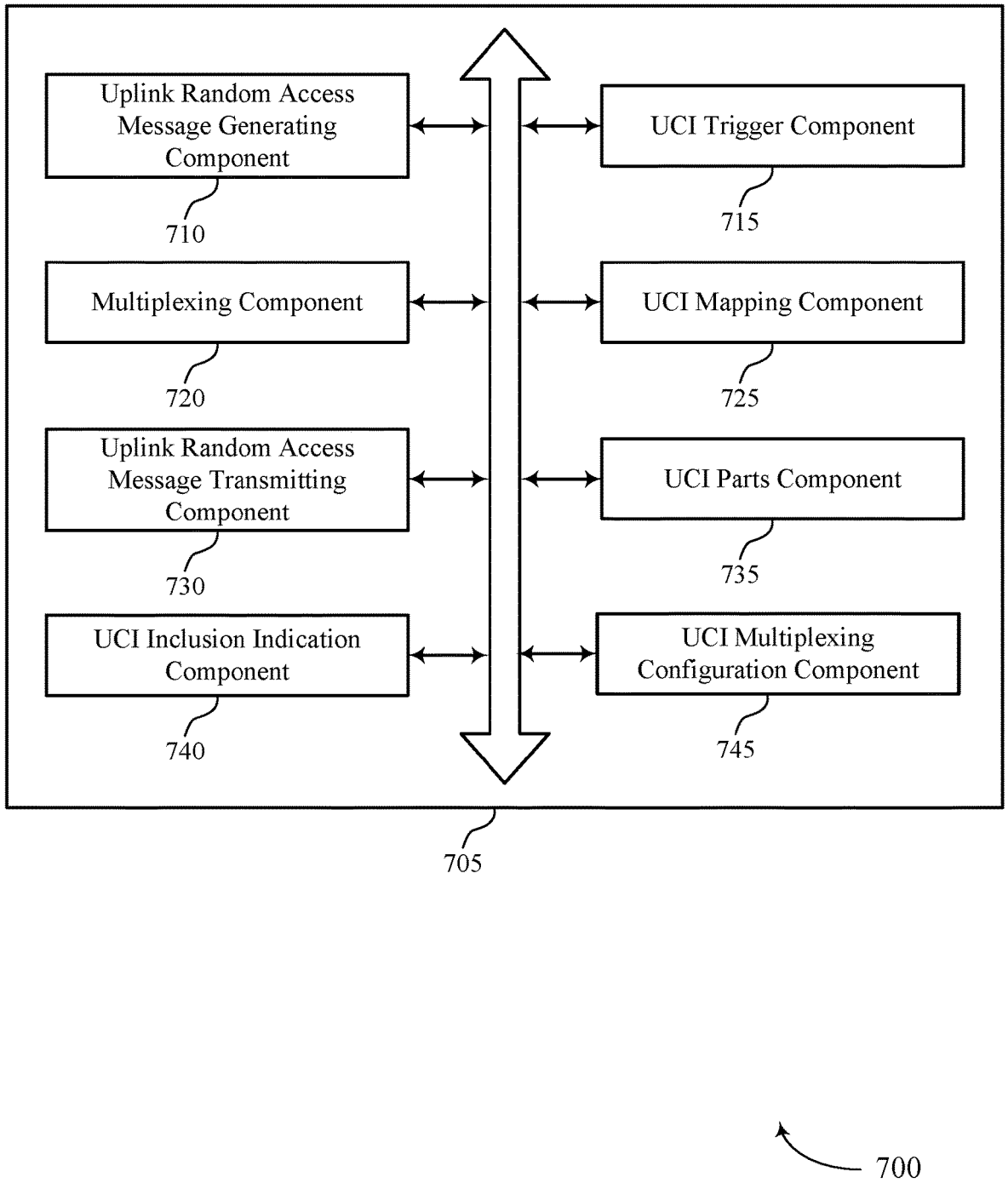
FIG. 7 shows a block diagram of a communications manager that supports transmitting uplink control information in a two-step random access procedure in accordance with aspects of the present disclosure.

FIG. 7 shows a block diagram 700 of a communications manager 705 that supports transmitting uplink control information in a two-step random access procedure in accordance with aspects of the present disclosure. The communications manager 705 may be an example of aspects of a communications manager 515, a communications manager 615, or a communications manager 810 described herein. The communications manager 705 may include an uplink random access message generating component 710, a UCI trigger component 715, a multiplexing component 720, a UCI mapping component 725, an uplink random access message transmitting component 730, a UCI parts component 735, a UCI inclusion indication component 740 and a UCI multiplexing configuration component 745. Each of these modules may communicate, directly or indirectly, with one another (e.g., via one or more buses).

The UCI multiplexing configuration component 745 may identify a configuration for multiplexing uplink control information on an uplink random access message of a two-step random access procedure.

The uplink random access message generating component 710 may generate the uplink random access message, the uplink random access message including a random access preamble and an associated uplink shared channel resource unit. In some cases, the UE is in an RRC active mode, an RRC idle mode, or an RRC inactive mode.

In some cases, the two-step random access procedure is a contention-free two-step random access procedure or a contention-based two-step random access procedure.

The UCI trigger component 715 may identify a trigger for inclusion of the uplink control information with the uplink random access message. In some examples, the UCI trigger component 715 may receive a downlink control channel message from the base station, where the inclusion of uplink control information is based on receiving the downlink control channel message. In some examples, the UCI trigger component 715 may receive a group common downlink control channel message from the base station, where the inclusion of uplink control information is based on receiving the group common downlink control channel message.

In some examples, the UCI trigger component 715 may receive RRC signaling from the base station, where the inclusion of uplink control information is based on receiving the RRC signaling. In some examples, the UCI trigger component 715 may determine the uplink random access message is a retransmission of an initial uplink random access message. In some examples, the UCI trigger component 715 may identify configured sets of resource unit sizes, modulation and coding schemes (MCS), transport block sizes (TBS), or any combination thereof. In some examples, the UCI trigger component 715 may select a resource unit size, an MCS, and a TBS to use for the uplink random access message. In some examples, the UCI trigger component 715 may include an indicator of the selected resource unit size, the selected MCS, and the selected TBS in the uplink control information.

In some examples, the UCI trigger component 715 may identify a configured set of random access occasions. In some examples, the UCI trigger component 715 may select a random access occasion for transmitting the uplink random access message from the configured set of random access occasions, where the random access occasion is associated with a synchronization signal block (SSB) beam index.

In some examples, the UCI trigger component 715 may identify a configured set of random access preambles. In some examples, the UCI trigger component 715 may select the random access preamble from the configured set of random access preambles, where the random access preamble is associated with a synchronization signal block (SSB) beam index.

In some examples, the UCI trigger component 715 may include an indicator of the SSB beam index in the uplink control information. In some examples, the UCI trigger component 715 may perform a measurement on a downlink reference signal from the base station to obtain a downlink measurement. In some examples, the UCI trigger component 715 may include an indicator of the downlink measurement in the uplink control information. In some cases, the uplink control information includes a redundancy version, a HARQ process identifier, or both.

In some cases, the uplink control information includes uplink shared channel configuration information, ACK or NACK feedback, a CSI report, a scheduling request, interference measurement information, positioning measurement information, reference signal received power (RSRP) measurement information, beam management information, or any combination thereof. In some cases, the uplink shared channel configuration information includes modulation and coding scheme (MCS) information, a redundancy version, a transport block size (TB S), a new data indicator (NDI), a HARQ process number, or any combination thereof. In some cases, the RSRP measurement information is from a serving cell, one or more neighboring cells, or any combination thereof. In some cases, the beam management information includes a list of preferred beam indexes.

In some cases, the beam management information includes transmit beam switching information indicating a first transmit beam for the random access preamble and a second transmit beam for the uplink shared channel resource unit. In some cases, the uplink control information includes ACK or NACK feedback, a CSI report, a scheduling request, or any combination thereof.

The multiplexing component 720 may multiplex the uplink control information and a reference signal in the uplink shared channel resource unit based on the configuration. The UCI mapping component 725 may map the uplink control information to resource elements in the uplink shared channel resource unit based on a priority of the uplink control information and a location of resource elements to which the reference signal is mapped. In some examples, the UCI mapping component 725 may identify configuration information for mapping the uplink control information, the configuration information including a beta offset, formats for the uplink control information, a payload size, or any combination thereof.

In some examples, the UCI mapping component 725 may receive an indication of the configuration information from the base station based on an RRC state of the UE, where the configuration information is identified based on receiving the indication. In some cases, the indication is received in a SIB, an RRC message, or downlink control information. The uplink random access message transmitting component 730 may transmit the uplink random access message including the uplink control information to a base station.

The UCI parts component 735 may identify a set of uplink control information parts of the uplink control information. In some examples, the UCI parts component 735 may map the set of uplink control information parts to respective resource elements based on respective priorities of the set of uplink control information parts. In some examples, the UCI parts component 735 may map a first uplink control information part with a higher priority closer to resource elements to which the reference signal is mapped than a second uplink control information part with a lower priority.

In some examples, the UCI parts component 735 may indicate a number of uplink control information parts in the set of uplink control information parts based on a preamble grouping for the random access preamble. In some examples, the UCI parts component 735 may indicate a number of uplink control information parts in the set of uplink control information parts based on a DMRS grouping. In some examples, the UCI parts component 735 may indicate a number of uplink control information parts in the set of uplink control information parts based on puncturing the uplink shared channel resource unit.

In some examples, the UCI parts component 735 may include, in a first uplink control information part, a pointer to a second uplink control information part, where a number of uplink control information parts in the set of uplink control information parts is indicated based on a number of pointers including at least the pointer. In some examples, the UCI parts component 735 may include an indicator of the SSB beam index in the uplink control information. In some cases, each uplink control information part of the set of uplink control information parts includes a different type of the uplink control information.

The UCI inclusion indication component 740 may indicate that the uplink random access message includes the uplink control information based on a preamble grouping for the random access preamble. In some examples, indicating that the uplink random access message includes the uplink control information based on a DMRS grouping. In some examples, indicating that the uplink random access message includes the uplink control information based on puncturing the uplink shared channel resource unit.

Figure 8:
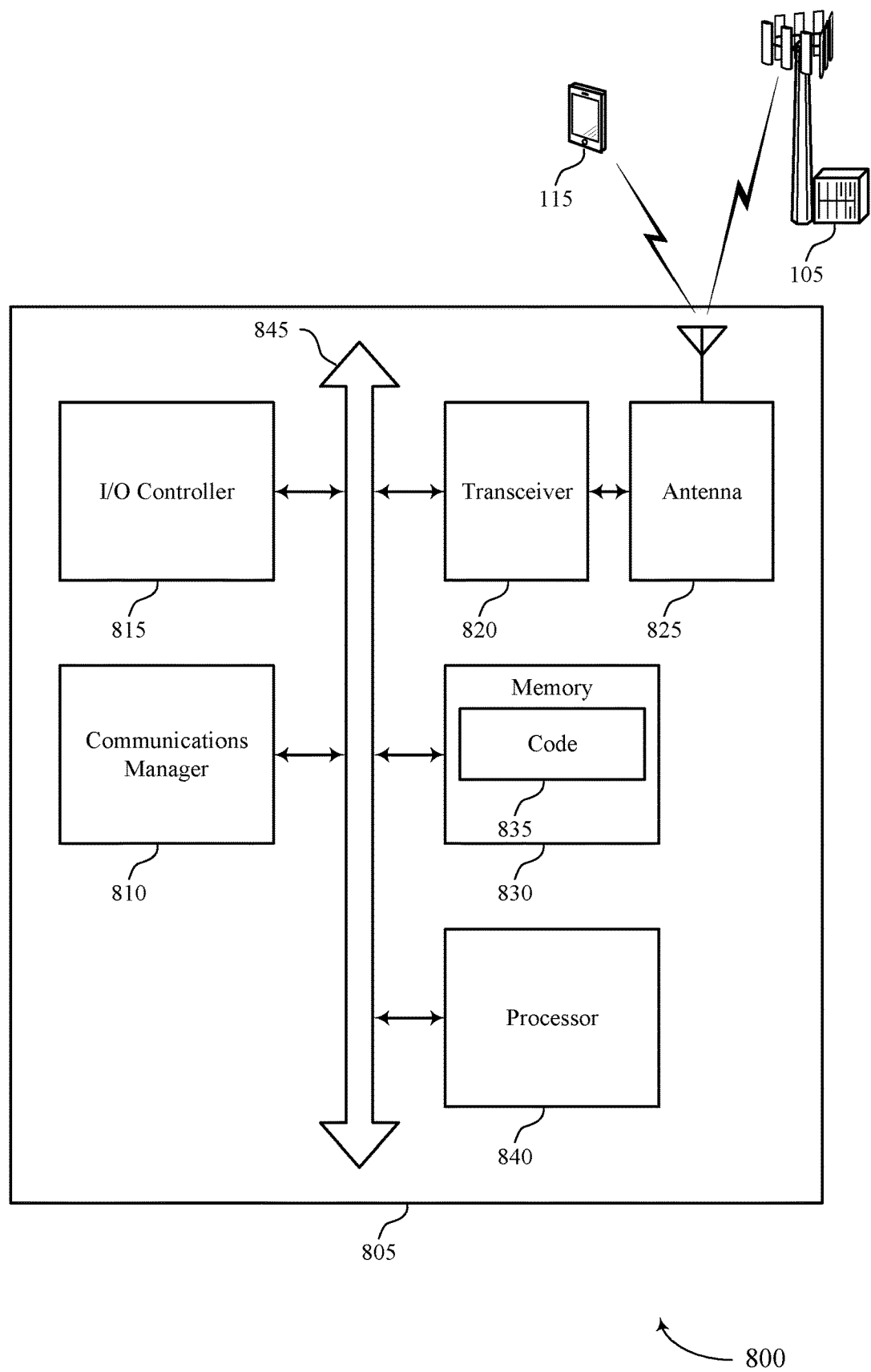
FIG. 8 shows a diagram of a system including a device that supports transmitting uplink control information in a two-step random access procedure in accordance with aspects of the present disclosure.

FIG. 8 shows a diagram of a system 800 including a device 805 that supports transmitting uplink control information in a two-step random access procedure in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify a configuration for multiplexing uplink control information on an uplink random access message of a two-step random access procedure, generate the uplink random access message, the uplink random access message including a random access preamble and an associated uplink shared channel resource unit, identify a trigger for inclusion of the uplink control information with the uplink random access message, multiplex the uplink control information and a reference signal in the uplink shared channel resource unit based on the configuration, map the uplink control information to resource elements in the uplink shared channel resource unit based on a type of the uplink control information and a location of resource elements to which the reference signal is mapped, and transmit the uplink random access message including the uplink control information to a base station. In some examples, the priority of the uplink control information may be based on, or associated with, a type of the uplink control information.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting transmitting uplink control information in a two-step random access procedure).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
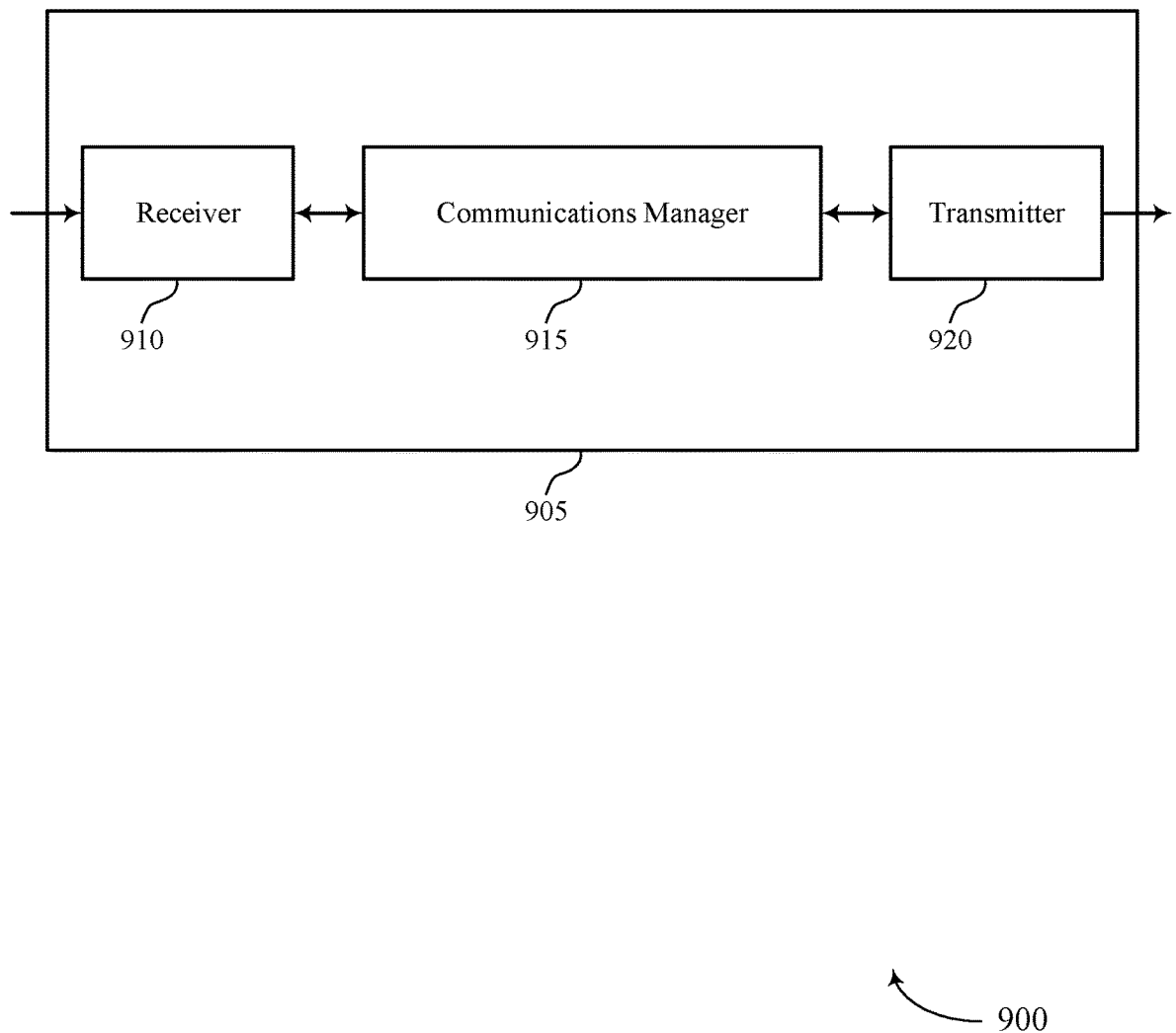
FIGS. 9 and 10 show block diagrams of devices that support transmitting uplink control information in a two-step random access procedure in accordance with aspects of the present disclosure.

FIG. 9 shows a block diagram 900 of a device 905 that supports transmitting uplink control information in a two-step random access procedure in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to transmitting uplink control information in a two-step random access procedure, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive an uplink random access message of a two-step random access procedure, the uplink random access message including a random access preamble and an associated uplink shared channel resource unit, identify that uplink control information is included in the uplink random access message, identify a mapping of the uplink control information to resource elements in the uplink shared channel resource unit based on a priority of the uplink control information and a location of resource elements to which a reference signal is mapped, decode the uplink control information based on the mapping, and decode the uplink random access message based on the uplink control information. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the base station communications manager 915 as described herein may be implemented to realize one or more potential advantages. One implementation may allow a base station 105 to efficiently decode an uplink random access message. UCI piggybacked onto the uplink random access message may include information which the base station 105 can use to efficiently decode the uplink random access message. For example, if the uplink random access message is a retransmission, the UCI may include a redundancy version, a HARQ process ID, or both. The base station 105 may then perform HARQ combining based on this information. Generally, the UCI may improve blind decoding performance at the base station 105.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
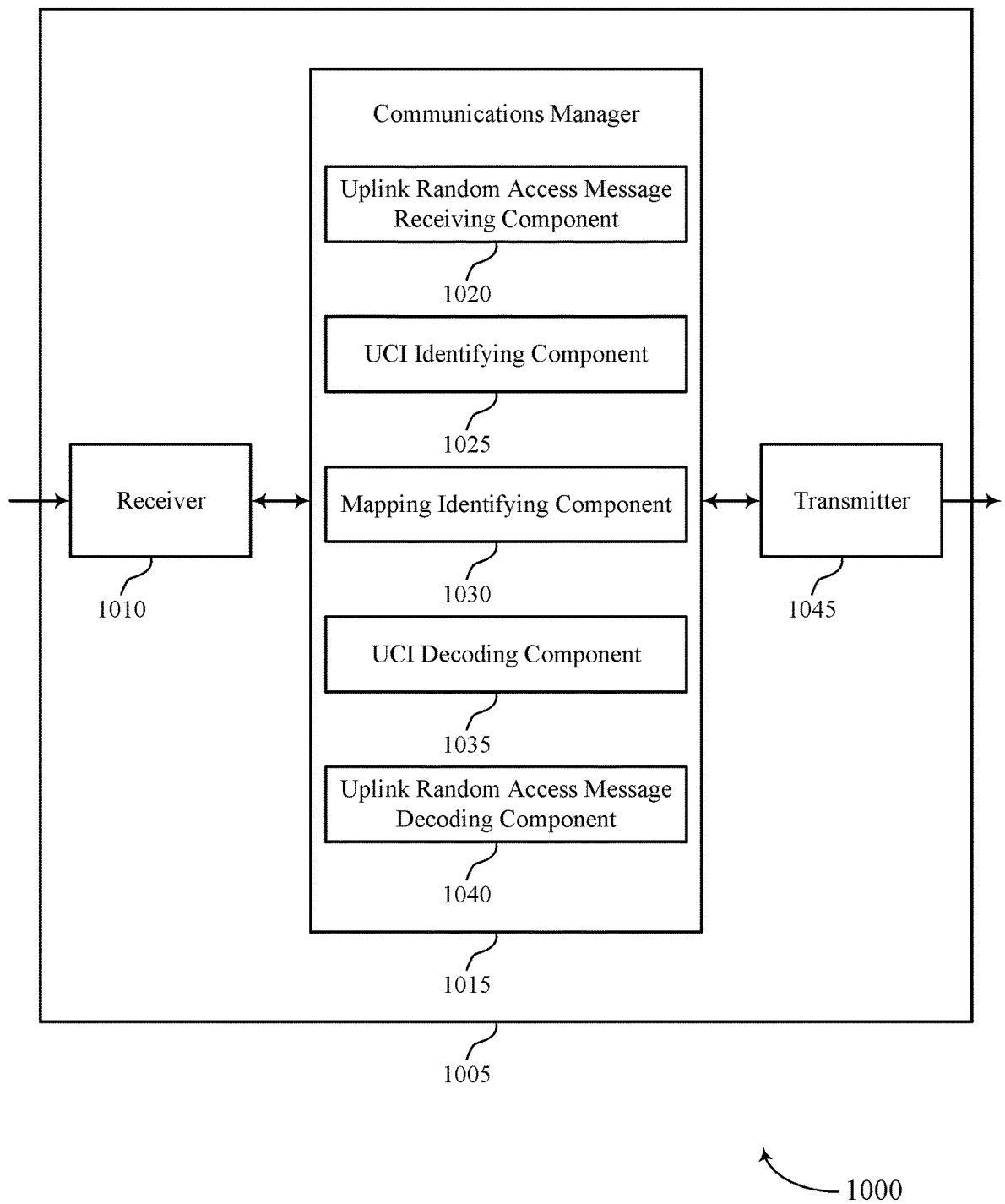

FIG. 10 shows a block diagram 1000 of a device 1005 that supports transmitting uplink control information in a two-step random access procedure in accordance with aspects of the present disclosure. The device 1005 may be an example of aspects of a device 905, or a base station 105 as described herein. The device 1005 may include a receiver 1010, a communications manager 1015, and a transmitter 1045. The device 1005 may also include a processor. Each of these components may be in communication with one another (e.g., via one or more buses).

The receiver 1010 may receive information such as packets, user data, or control information associated with various information channels (e.g., control channels, data channels, and information related to transmitting uplink control information in a two-step random access procedure, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an uplink random access message receiving component 1020, a UCI identifying component 1025, a mapping identifying component 1030, a UCI decoding component 1035, and an uplink random access message decoding component 1040. The communications manager 1015 may be an example of aspects of the communications manager 1210 described herein.

The uplink random access message receiving component 1020 may receive an uplink random access message of a two-step random access procedure, the uplink random access message including a random access preamble and an associated uplink shared channel resource unit.

The UCI identifying component 1025 may identify that uplink control information is included in the uplink random access message. The mapping identifying component 1030 may identify a mapping of the uplink control information to resource elements in the uplink shared channel resource unit based on a priority of the uplink control information and a location of resource elements to which a reference signal is mapped. The UCI decoding component 1035 may decode the uplink control information based on the mapping. The uplink random access message decoding component 1040 may decode the uplink random access message based on the uplink control information.

The transmitter 1045 may transmit signals generated by other components of the device 1005. In some examples, the transmitter 1045 may be collocated with a receiver 1010 in a transceiver module. For example, the transmitter 1045 may be an example of aspects of the transceiver 1220 described with reference to FIG. 12. The transmitter 1045 may utilize a single antenna or a set of antennas.

Figure 11:
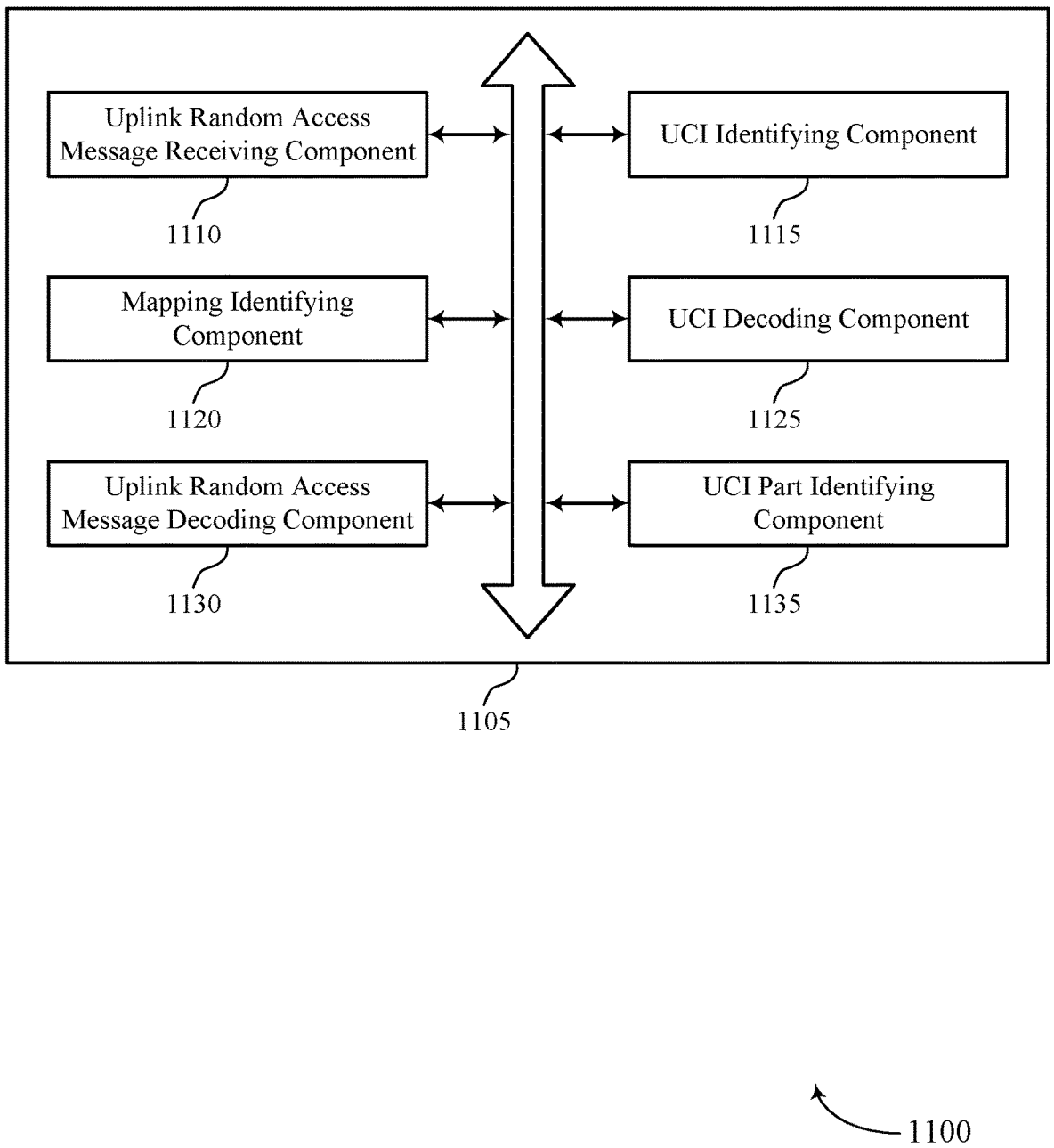
FIG. 11 shows a block diagram of a communications manager that supports transmitting uplink control information in a two-step random access procedure in accordance with aspects of the present disclosure.

FIG. 11 shows a block diagram 1100 of a communications manager 1105 that supports transmitting uplink control information in a two-step random access procedure in accordance with aspects of the present disclosure. The communications manager 1105 may be an example of aspects of a communications manager 915, a communications manager 1015, or a communications manager 1210 described herein. The communications manager 1105 may include an uplink random access message receiving component 1110, a UCI identifying component 1115, a mapping identifying component 1120, a UCI decoding component 1125, an uplink random access message decoding component 1130, and a UCI part identifying component 1135. Each of these modules may communicate, directly or indirectly, with one another (e.g., via one or more buses).

The uplink random access message receiving component 1110 may receive an uplink random access message of a two-step random access procedure, the uplink random access message including a random access preamble and an associated uplink shared channel resource unit.

In some cases, the UE is in an RRC active mode, an RRC idle mode, or an RRC inactive mode. In some cases, the two-step random access procedure is a contention-free two-step random access procedure or a contention-based two-step random access procedure.

The UCI identifying component 1115 may identify that uplink control information is included in the uplink random access message. In some examples, the UCI identifying component 1115 may transmit a downlink control channel message to the UE, where the downlink control channel message triggers the UE to include the uplink control information in the uplink random access message.

In some examples, the UCI identifying component 1115 may transmit a group common downlink control channel message to the UE, where the group common downlink control channel message triggers the UE to include the uplink control information in the uplink random access message. In some examples, the UCI identifying component 1115 may determine the uplink random access message is a retransmission of an initial uplink random access message.

In some examples, the UCI identifying component 1115 may identify a configured set of random access occasions, where each random access occasion of the configured set of random access occasions is associated with a synchronization signal block (SSB) beam index. In some examples, the UCI identifying component 1115 may identify, from the UE, an indicator of an SSB beam index associated with a random access occasion of the configured set of random access occasions in the uplink control information.

In some examples, the UCI identifying component 1115 may identify a configured set of random access preambles, where each random access preamble of the configured set of random access preambles is associated with a synchronization signal block (SSB) beam index. In some examples, the UCI identifying component 1115 may identify, from the UE, an indicator of an SSB beam index associated with the random access preamble in the uplink control information.

In some examples, the UCI identifying component 1115 may transmit a downlink reference signal to the UE. In some examples, the UCI identifying component 1115 may identify an indicator of a downlink measurement for the downlink reference signal in the uplink control information.

In some cases, the uplink control information includes a redundancy version, a HARQ process identifier, or both. In some cases, the uplink control information includes uplink shared channel configuration information, ACK or NACK feedback, a CSI report, a scheduling request, interference measurement information, positioning measurement information, reference signal received power (RSRP) measurement information, beam management information, or any combination thereof. In some cases, the uplink shared channel configuration information includes modulation and coding scheme (MCS) information, a redundancy version, a transport block size (TBS), a new data indicator (NDI), a HARQ process number, or any combination thereof. In some cases, the RSRP measurement information is from the base station, one or more neighboring cells of the base station, or any combination thereof.

In some cases, the beam management information includes a list of preferred beam indexes. In some cases, the beam management information includes transmit beam switching information indicating a first transmit beam for the random access preamble and a second transmit beam for the uplink shared channel resource unit. In some cases, the uplink control information includes ACK or NACK feedback, a CSI report, a scheduling request, or any combination thereof. In some cases, the identifying that uplink control information is included in the uplink random access message is based on a preamble grouping for the random access preamble. In some cases, the identifying that uplink control information is included in the uplink random access message is based on a DMRS grouping. In some cases, the identifying that uplink control information is included in the uplink random access message is based on puncturing the uplink shared channel resource unit.

The mapping identifying component 1120 may identify a mapping of the uplink control information to resource elements in the uplink shared channel resource unit based on a priority of the uplink control information and a location of resource elements to which a reference signal is mapped. In some examples, the mapping identifying component 1120 may determine configuration information for mapping the uplink control information, the configuration information including a beta offset, formats for the uplink control information, a payload size, or any combination thereof.

In some examples, the mapping identifying component 1120 may transmit an indication of the configuration information to the UE based on an RRC state of the UE, where the configuration information is identified based on receiving the indication. In some cases, the indication is received in a SIB, an RRC message, or downlink control information.

The UCI decoding component 1125 may decode the uplink control information based on the mapping. The uplink random access message decoding component 1130 may decode the uplink random access message based on the uplink control information.

The UCI part identifying component 1135 may identify a set of uplink control information parts of the uplink control information. In some examples, the UCI part identifying component 1135 may identify a mapping of the set of uplink control information parts to respective resource elements based on respective priorities of the set of uplink control information parts. In some examples, the UCI part identifying component 1135 may identify that a first uplink control information part with a higher priority is mapped closer to resource elements to which the reference signal is mapped than a second uplink control information part with a lower priority. In some examples, the UCI part identifying component 1135 may decode the first uplink control information part with the higher priority based on the first uplink control information part being mapped closer to resource elements to which the reference signal is mapped.

In some examples, the UCI part identifying component 1135 may identify a number of uplink control information parts in the set of uplink control information parts based on a preamble grouping for the random access preamble. In some examples, the UCI part identifying component 1135 may identify a number of uplink control information parts in the set of uplink control information parts based on a DMRS grouping. In some examples, the UCI part identifying component 1135 may identify a number of uplink control information parts in the set of uplink control information parts based on puncturing the uplink shared channel resource unit.

In some examples, the UCI part identifying component 1135 may identify, in a first uplink control information part, a pointer to a second uplink control information part, where a number of uplink control information parts in the set of uplink control information parts is identified based on a number of pointers including at least the pointer.

In some cases, each uplink control information part of the set of uplink control information parts includes a different type of the uplink control information.

Figure 12:
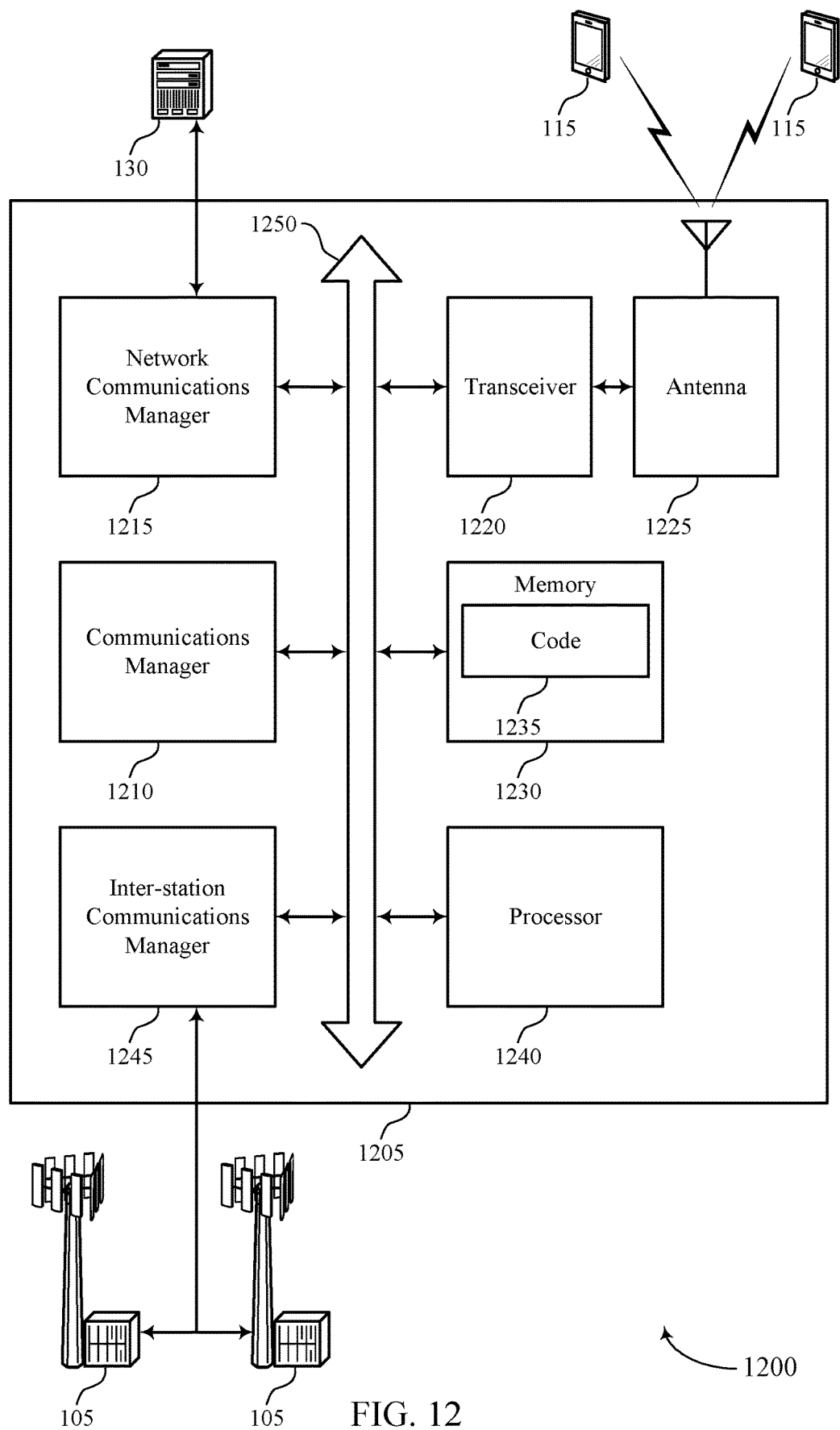
FIG. 12 shows a diagram of a system including a device that supports transmitting uplink control information in a two-step random access procedure in accordance with aspects of the present disclosure.

FIG. 12 shows a diagram of a system 1200 including a device 1205 that supports transmitting uplink control information in a two-step random access procedure in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive an uplink random access message of a two-step random access procedure, the uplink random access message including a random access preamble and an associated uplink shared channel resource unit, identify that uplink control information is included in the uplink random access message, identify a mapping of the uplink control information to resource elements in the uplink shared channel resource unit based on a priority of the uplink control information and a location of resource elements to which a reference signal is mapped, decode the uplink control information based on the mapping, and decode the uplink random access message based on the uplink control information.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting transmitting uplink control information in a two-step random access procedure).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
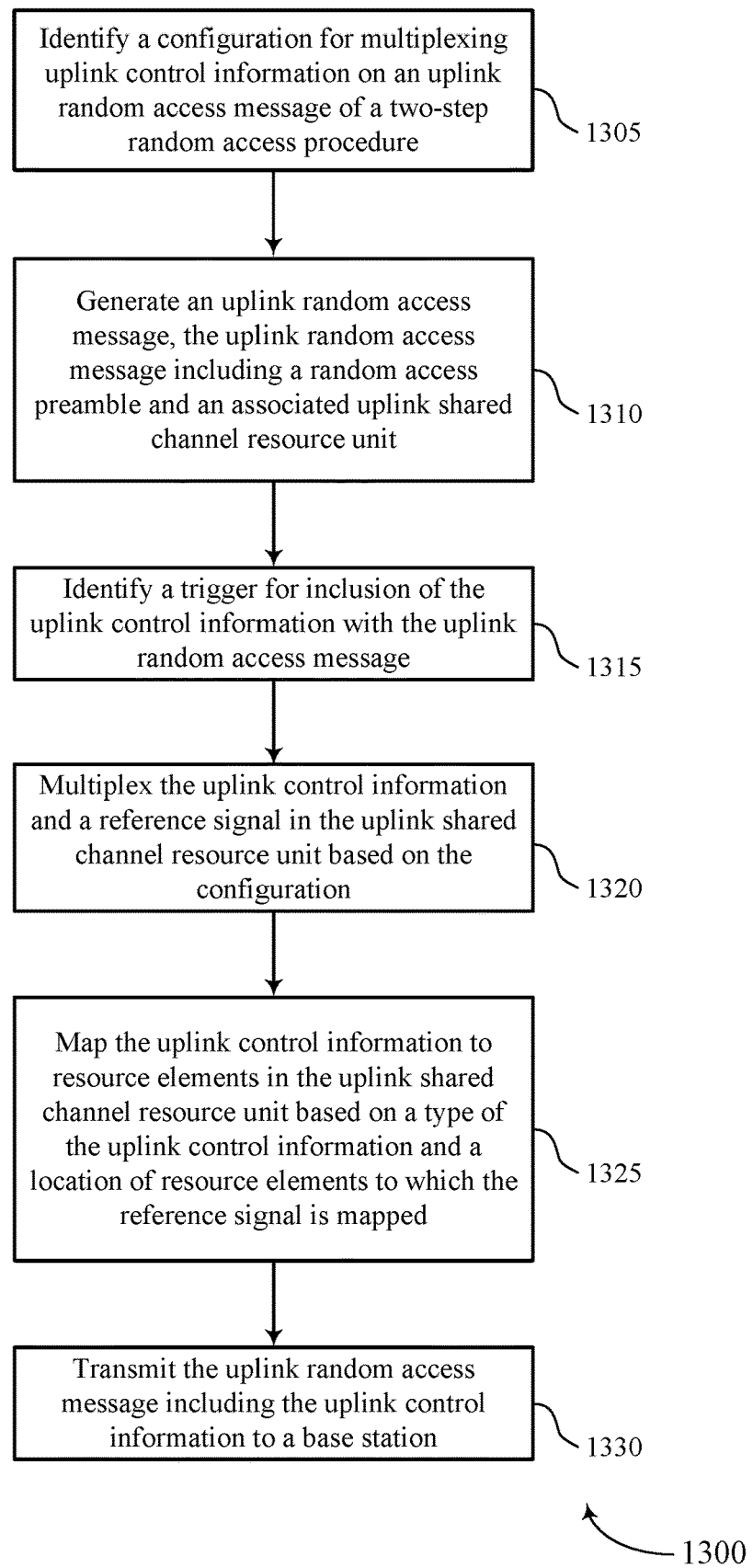
FIGS. 13 through 18 show flowcharts illustrating methods that support transmitting uplink control information in a two-step random access procedure in accordance with aspects of the present disclosure.

FIG. 13 shows a flowchart illustrating a method 1300 that supports transmitting uplink control information in a two-step random access procedure in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify a configuration for multiplexing uplink control information on an uplink random access message of a two-step random access procedure. The operations of 1305 may be performed according to the methods described herein. In some examples, aspects of the operations of 1305 may be performed by a UCI multiplexing configuration component as described with reference to FIGS. 5 through 8.

At 1310, the UE may generate an uplink random access message of a two-step random access procedure, the uplink random access message including a random access preamble and an associated uplink shared channel resource unit. The operations of 1310 may be performed according to the methods described herein. In some examples, aspects of the operations of 1310 may be performed by an uplink random access message generating component as described with reference to FIGS. 5 through 8.

At 1315, the UE may identify a trigger for inclusion of uplink control information with the uplink random access message. The operations of 1315 may be performed according to the methods described herein. In some examples, aspects of the operations of 1315 may be performed by a UCI trigger component as described with reference to FIGS. 5 through 8.

At 1320, the UE may multiplex the uplink control information and a reference signal with the uplink shared channel resource unit. The operations of 1320 may be performed according to the methods described herein. In some examples, aspects of the operations of 1320 may be performed by a multiplexing component as described with reference to FIGS. 5 through 8.

At 1325, the UE may map the uplink control information to resource elements in the uplink shared channel resource unit based on a priority of the uplink control information and a location of resource elements to which the reference signal is mapped. The operations of 1325 may be performed according to the methods described herein. In some examples, aspects of the operations of 1325 may be performed by a UCI mapping component as described with reference to FIGS. 5 through 8.

At 1330, the UE may transmit the uplink random access message including the uplink control information to a base station. The operations of 1330 may be performed according to the methods described herein. In some examples, aspects of the operations of 1330 may be performed by an uplink random access message transmitting component as described with reference to FIGS. 5 through 8.

Figure 14:
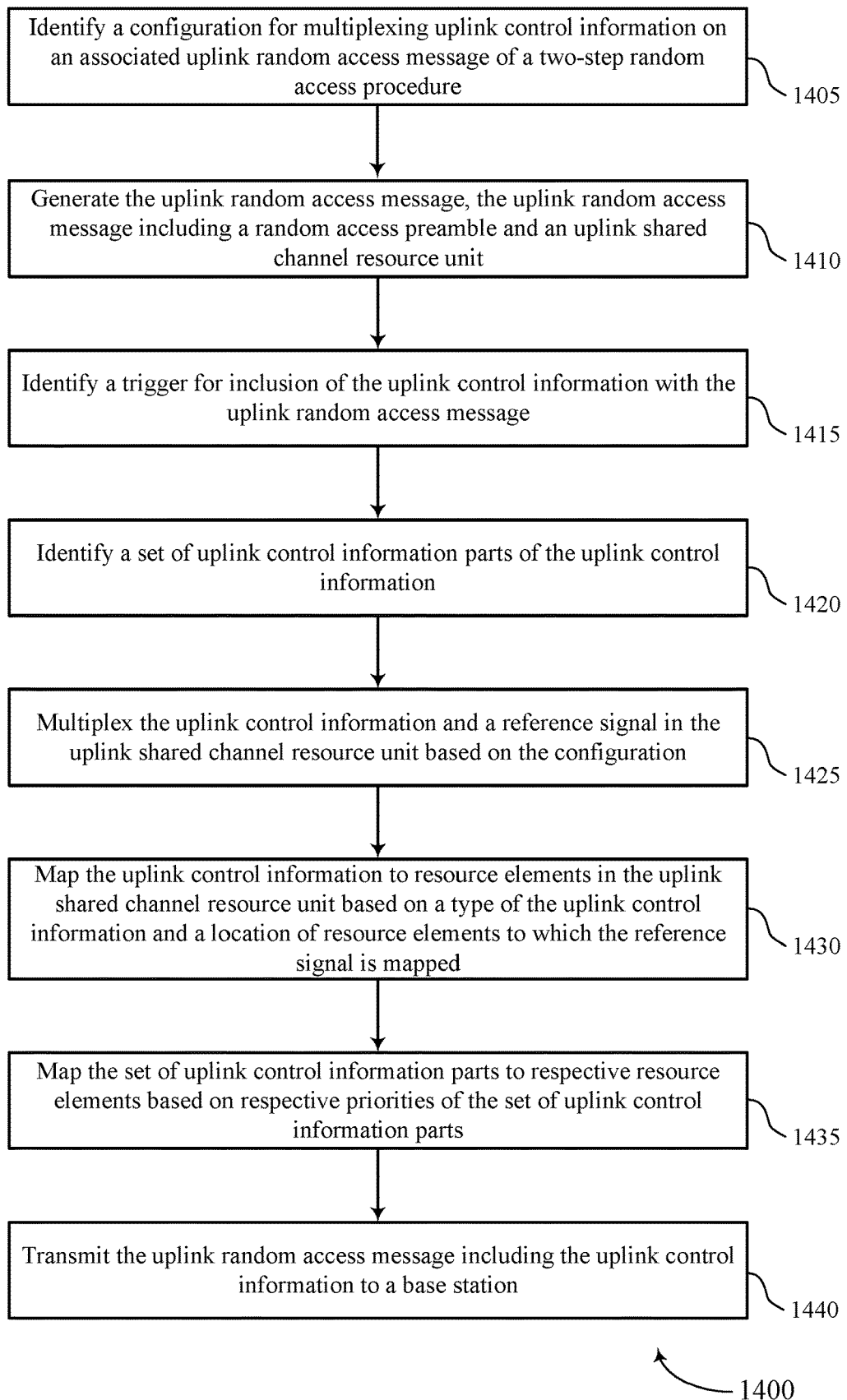

FIG. 14 shows a flowchart illustrating a method 1400 that supports transmitting uplink control information in a two-step random access procedure in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may identify a configuration for multiplexing uplink control information on an uplink random access message of a two-step random access procedure. The operations of 1405 may be performed according to the methods described herein. In some examples, aspects of the operations of 1405 may be performed by a UCI multiplexing configuration component as described with reference to FIGS. 5 through 8.

At 1410, the UE may generate an uplink random access message of a two-step random access procedure, the uplink random access message including a random access preamble and an associated uplink shared channel resource unit. The operations of 1410 may be performed according to the methods described herein. In some examples, aspects of the operations of 1410 may be performed by an uplink random access message generating component as described with reference to FIGS. 5 through 8.

At 1415, the UE may identify a trigger for inclusion of uplink control information with the uplink random access message. The operations of 1415 may be performed according to the methods described herein. In some examples, aspects of the operations of 1415 may be performed by a UCI trigger component as described with reference to FIGS. 5 through 8.

At 1420, the UE may identify a set of uplink control information parts of the uplink control information. The operations of 1420 may be performed according to the methods described herein. In some examples, aspects of the operations of 1420 may be performed by a UCI parts component as described with reference to FIGS. 5 through 8.

At 1425, the UE may multiplex the uplink control information and a reference signal with the uplink shared channel resource unit. The operations of 1425 may be performed according to the methods described herein. In some examples, aspects of the operations of 1425 may be performed by a multiplexing component as described with reference to FIGS. 5 through 8.

At 1430, the UE may map the uplink control information to resource elements in the uplink shared channel resource unit based on a priority of the uplink control information and a location of resource elements to which the reference signal is mapped. The operations of 1430 may be performed according to the methods described herein. In some examples, aspects of the operations of 1430 may be performed by a UCI mapping component as described with reference to FIGS. 5 through 8.

At 1435, the UE may map the set of uplink control information parts to respective resource elements based on respective priorities of the set of uplink control information parts. The operations of 1435 may be performed according to the methods described herein. In some examples, aspects of the operations of 1435 may be performed by a UCI parts component as described with reference to FIGS. 5 through 8.

At 1440, the UE may transmit the uplink random access message including the uplink control information to a base station. The operations of 1440 may be performed according to the methods described herein. In some examples, aspects of the operations of 1440 may be performed by an uplink random access message transmitting component as described with reference to FIGS. 5 through 8.

Figure 15:
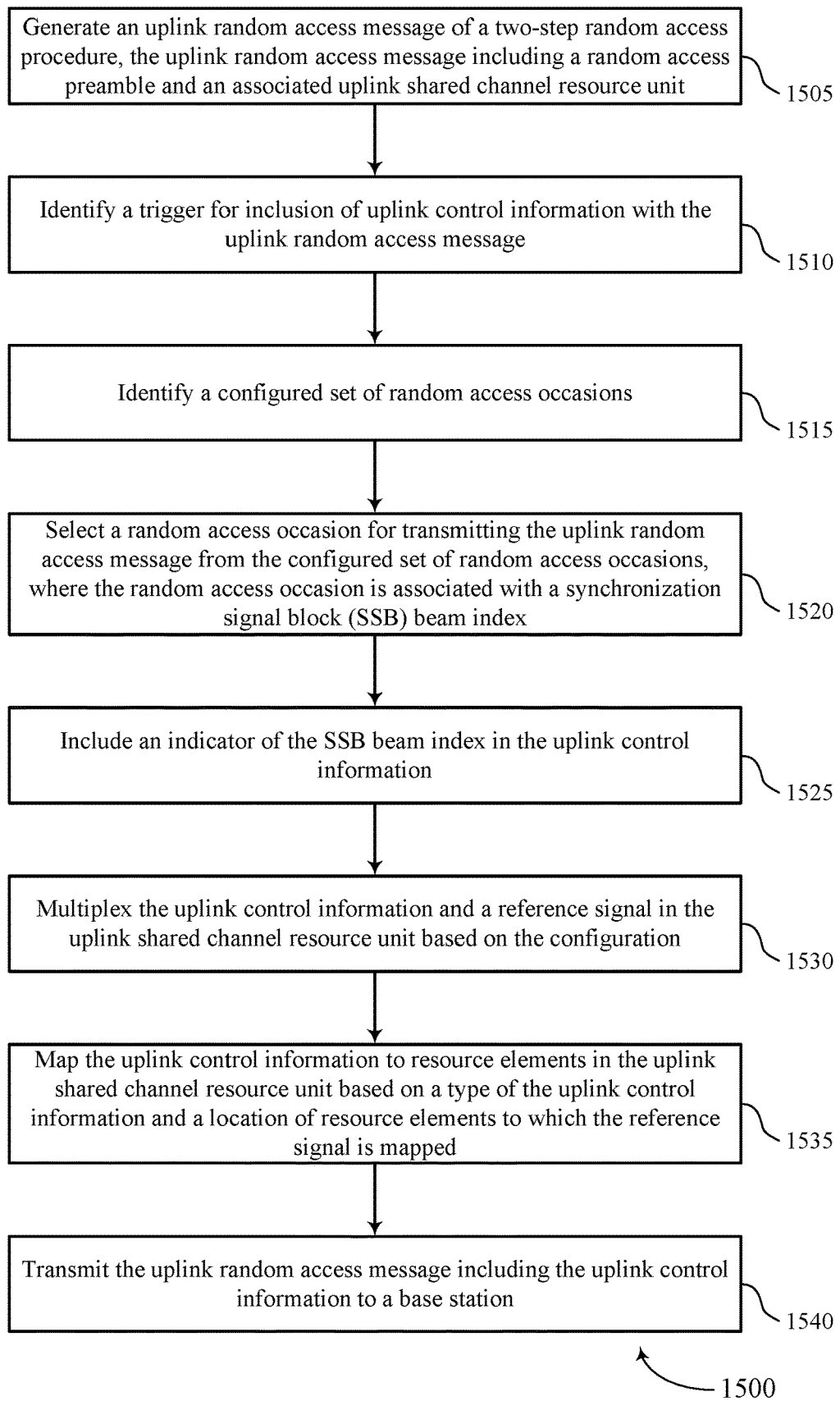

FIG. 15 shows a flowchart illustrating a method 1500 that supports transmitting uplink control information in a two-step random access procedure in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

In some cases, the UE may identify a configuration for multiplexing uplink control information on an uplink random access message of a two-step random access procedure. At 1505, the UE may generate an uplink random access message of a two-step random access procedure, the uplink random access message including a random access preamble and an associated uplink shared channel resource unit. The operations of 1505 may be performed according to the methods described herein. In some examples, aspects of the operations of 1505 may be performed by an uplink random access message generating component as described with reference to FIGS. 5 through 8.

At 1510, the UE may identify a trigger for inclusion of uplink control information with the uplink random access message. The operations of 1510 may be performed according to the methods described herein. In some examples, aspects of the operations of 1510 may be performed by a UCI trigger component as described with reference to FIGS. 5 through 8.

At 1515, the UE may identify a configured set of random access occasions. The operations of 1515 may be performed according to the methods described herein. In some examples, aspects of the operations of 1515 may be performed by a UCI trigger component as described with reference to FIGS. 5 through 8.

At 1520, the UE may select a random access occasion for transmitting the uplink random access message from the configured set of random access occasions, where the random access occasion is associated with a synchronization signal block (SSB) beam index. The operations of 1520 may be performed according to the methods described herein. In some examples, aspects of the operations of 1520 may be performed by a UCI trigger component as described with reference to FIGS. 5 through 8.

At 1525, the UE may include an indicator of the SSB beam index in the uplink control information. The operations of 1525 may be performed according to the methods described herein. In some examples, aspects of the operations of 1525 may be performed by a UCI parts component as described with reference to FIGS. 5 through 8.

At 1530, the UE may multiplex the uplink control information and a reference signal with the uplink shared channel resource unit. The operations of 1530 may be performed according to the methods described herein. In some examples, aspects of the operations of 1530 may be performed by a multiplexing component as described with reference to FIGS. 5 through 8.

At 1535, the UE may map the uplink control information to resource elements in the uplink shared channel resource unit based on a priority of the uplink control information and a location of resource elements to which the reference signal is mapped. The operations of 1535 may be performed according to the methods described herein. In some examples, aspects of the operations of 1535 may be performed by a UCI mapping component as described with reference to FIGS. 5 through 8.

At 1540, the UE may transmit the uplink random access message including the uplink control information to a base station. The operations of 1540 may be performed according to the methods described herein. In some examples, aspects of the operations of 1540 may be performed by an uplink random access message transmitting component as described with reference to FIGS. 5 through 8.

Figure 16:
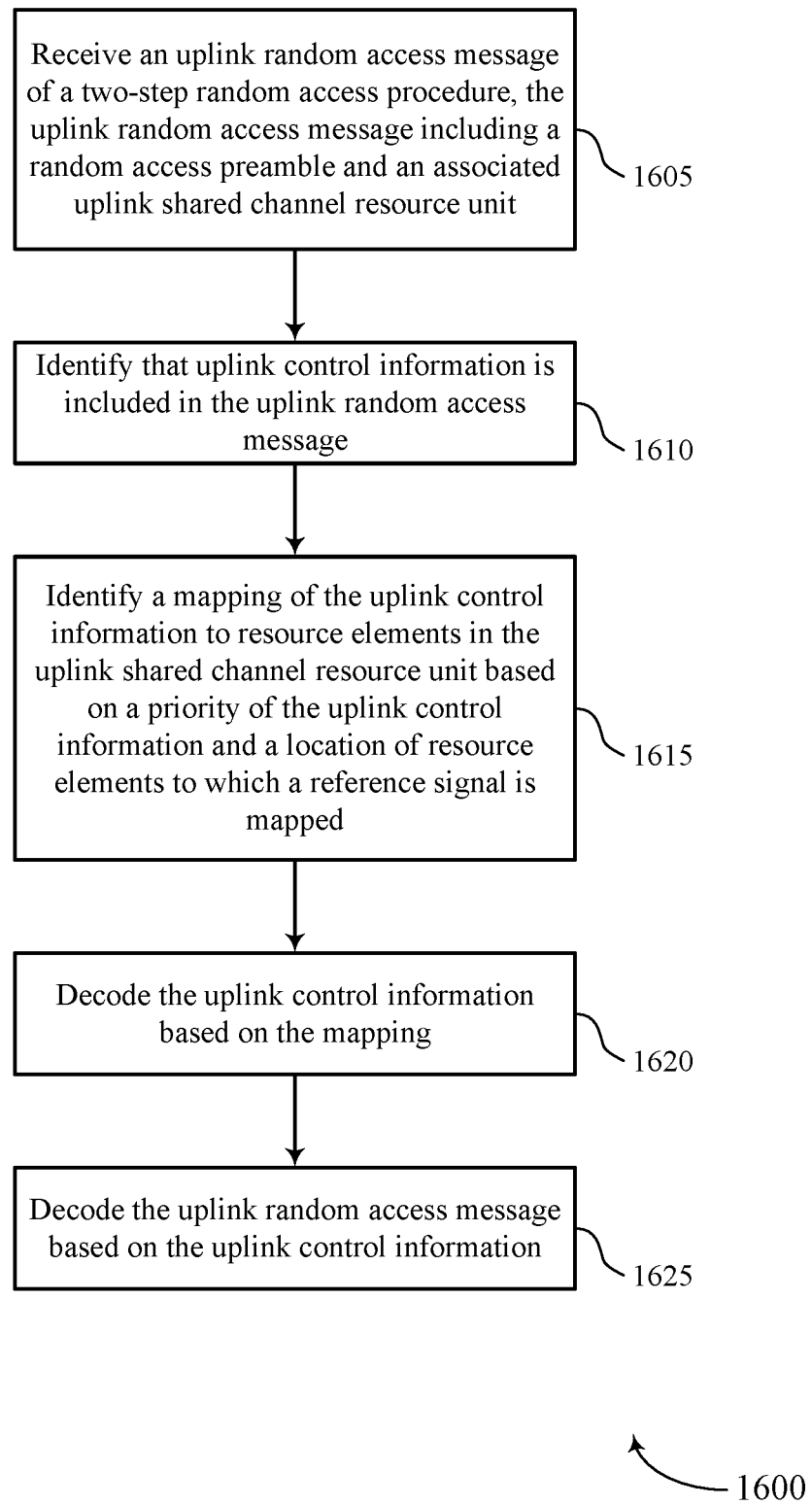

FIG. 16 shows a flowchart illustrating a method 1600 that supports transmitting uplink control information in a two-step random access procedure in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may receive an uplink random access message of a two-step random access procedure, the uplink random access message including a random access preamble and an associated uplink shared channel resource unit. The operations of 1605 may be performed according to the methods described herein. In some examples, aspects of the operations of 1605 may be performed by an uplink random access message receiving component as described with reference to FIGS. 9 through 12.

At 1610, the base station may identify that uplink control information is included in the uplink random access message. The operations of 1610 may be performed according to the methods described herein. In some examples, aspects of the operations of 1610 may be performed by a UCI identifying component as described with reference to FIGS. 9 through 12.

At 1615, the base station may identify a mapping of the uplink control information to resource elements in the uplink shared channel resource unit based on a priority of the uplink control information and a location of resource elements to which a reference signal is mapped. The operations of 1615 may be performed according to the methods described herein. In some examples, aspects of the operations of 1615 may be performed by a mapping identifying component as described with reference to FIGS. 9 through 12.

At 1620, the base station may decode the uplink control information based on the mapping. The operations of 1620 may be performed according to the methods described herein. In some examples, aspects of the operations of 1620 may be performed by a UCI decoding component as described with reference to FIGS. 9 through 12.

At 1625, the base station may decode the uplink random access message based on the uplink control information. The operations of 1625 may be performed according to the methods described herein. In some examples, aspects of the operations of 1625 may be performed by an uplink random access message decoding component as described with reference to FIGS. 9 through 12.

Figure 17:
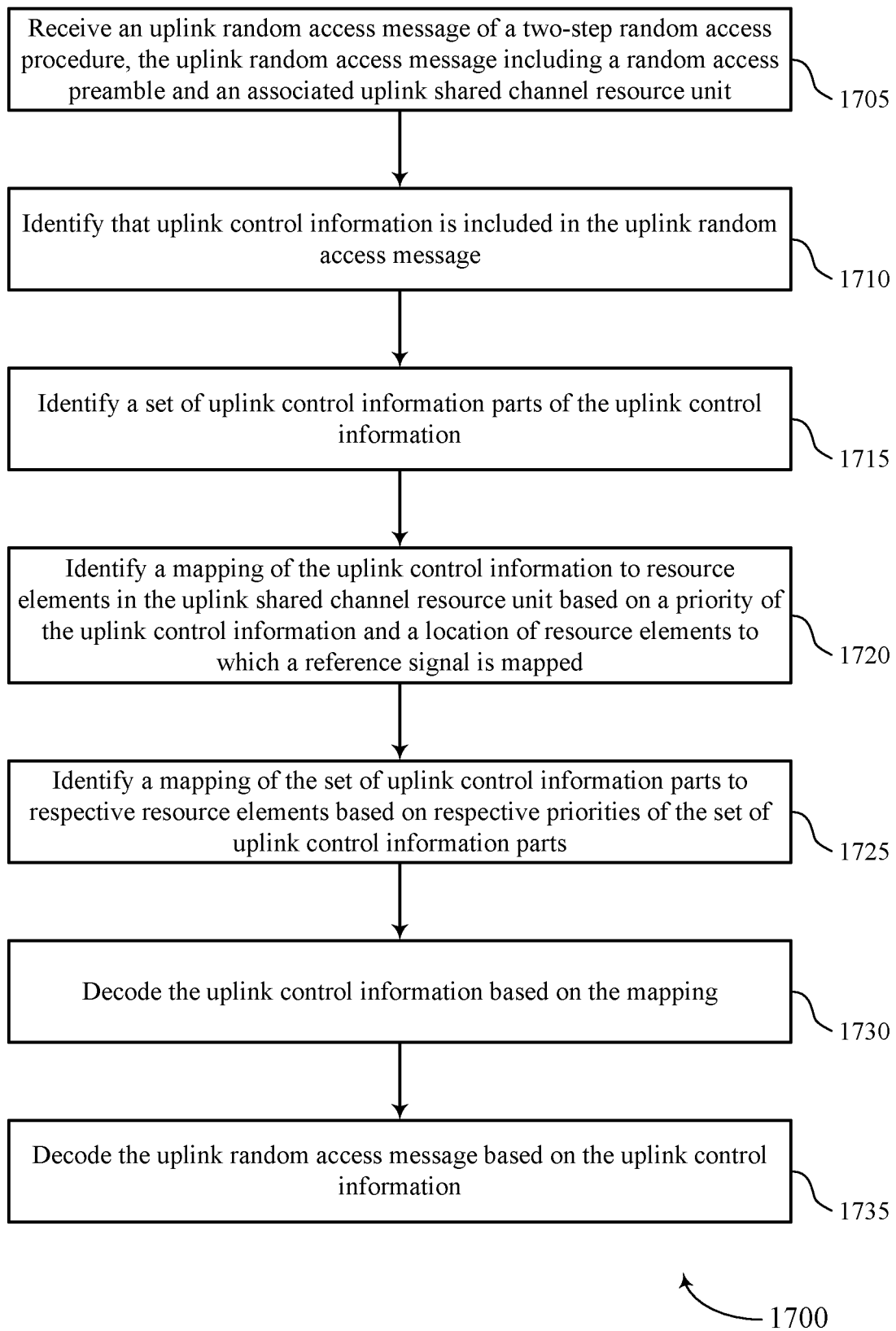

FIG. 17 shows a flowchart illustrating a method 1700 that supports transmitting uplink control information in a two-step random access procedure in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may receive an uplink random access message of a two-step random access procedure, the uplink random access message including a random access preamble and an associated uplink shared channel resource unit. The operations of 1705 may be performed according to the methods described herein. In some examples, aspects of the operations of 1705 may be performed by an uplink random access message receiving component as described with reference to FIGS. 9 through 12.

At 1710, the base station may identify that uplink control information is included in the uplink random access message. The operations of 1710 may be performed according to the methods described herein. In some examples, aspects of the operations of 1710 may be performed by a UCI identifying component as described with reference to FIGS. 9 through 12.

At 1715, the base station may identify a set of uplink control information parts of the uplink control information. The operations of 1715 may be performed according to the methods described herein. In some examples, aspects of the operations of 1715 may be performed by a UCI part identifying component as described with reference to FIGS. 9 through 12.

At 1720, the base station may identify a mapping of the uplink control information to resource elements in the uplink shared channel resource unit based on a priority of the uplink control information and a location of resource elements to which a reference signal is mapped. The operations of 1720 may be performed according to the methods described herein. In some examples, aspects of the operations of 1720 may be performed by a mapping identifying component as described with reference to FIGS. 9 through 12.

At 1725, the base station may identify a mapping of the set of uplink control information parts to respective resource elements based on respective priorities of the set of uplink control information parts. The operations of 1725 may be performed according to the methods described herein. In some examples, aspects of the operations of 1725 may be performed by a UCI part identifying component as described with reference to FIGS. 9 through 12.

At 1730, the base station may decode the uplink control information based on the mapping. The operations of 1730 may be performed according to the methods described herein. In some examples, aspects of the operations of 1730 may be performed by a UCI decoding component as described with reference to FIGS. 9 through 12.

At 1735, the base station may decode the uplink random access message based on the uplink control information. The operations of 1735 may be performed according to the methods described herein. In some examples, aspects of the operations of 1735 may be performed by an uplink random access message decoding component as described with reference to FIGS. 9 through 12.

Figure 18:
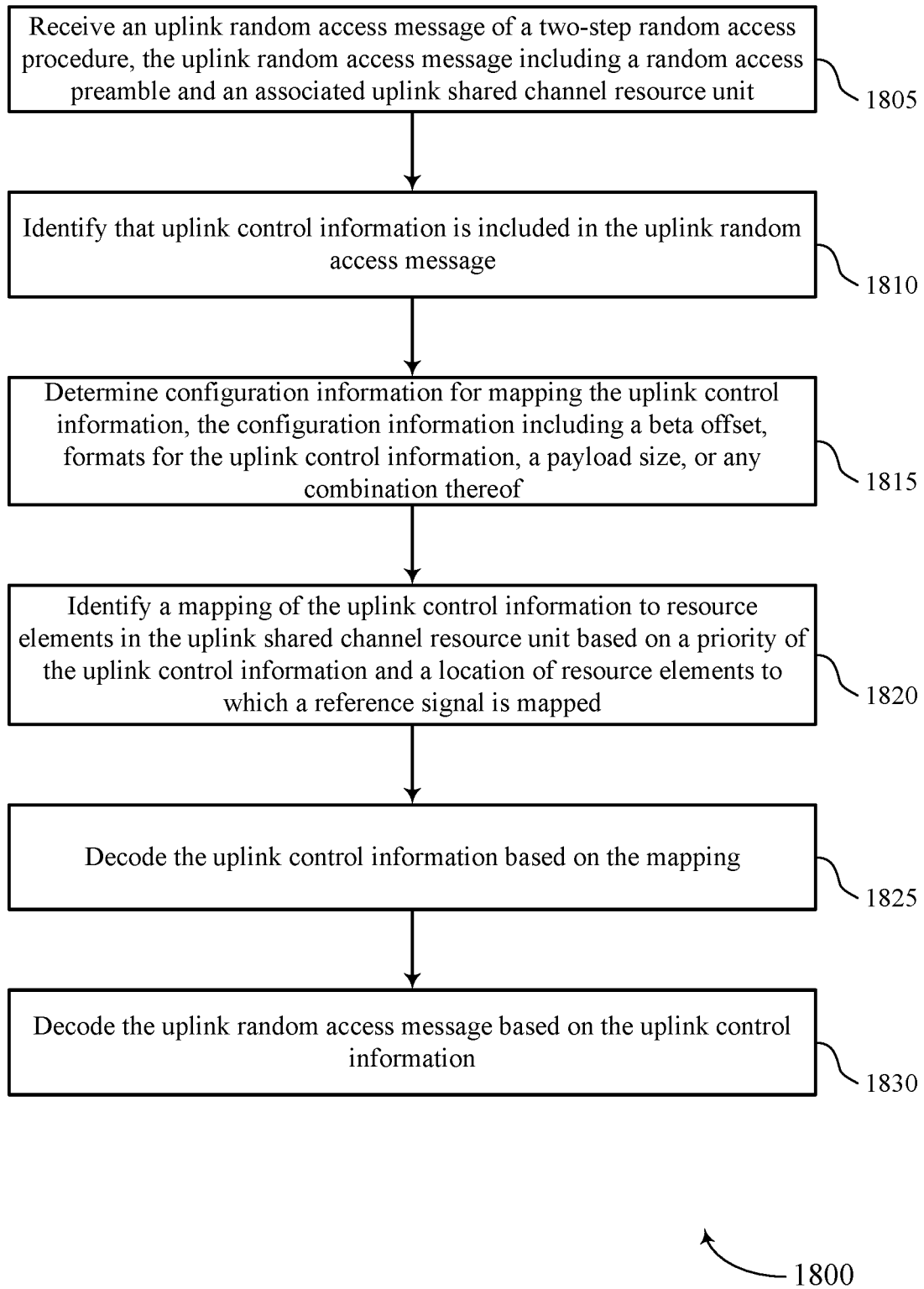

FIG. 18 shows a flowchart illustrating a method 1800 that supports transmitting uplink control information in a two-step random access procedure in accordance with aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may receive an uplink random access message of a two-step random access procedure, the uplink random access message including a random access preamble and an associated uplink shared channel resource unit. The operations of 1805 may be performed according to the methods described herein. In some examples, aspects of the operations of 1805 may be performed by an uplink random access message receiving component as described with reference to FIGS. 9 through 12.

At 1810, the base station may identify that uplink control information is included in the uplink random access message. The operations of 1810 may be performed according to the methods described herein. In some examples, aspects of the operations of 1810 may be performed by a UCI identifying component as described with reference to FIGS. 9 through 12.

At 1815, the base station may determine configuration information for mapping the uplink control information, the configuration information including a beta offset, formats for the uplink control information, a payload size, or any combination thereof. The operations of 1815 may be performed according to the methods described herein. In some examples, aspects of the operations of 1815 may be performed by a mapping identifying component as described with reference to FIGS. 9 through 12.

At 1820, the base station may identify a mapping of the uplink control information to resource elements in the uplink shared channel resource unit based on a priority of the uplink control information and a location of resource elements to which a reference signal is mapped. The operations of 1820 may be performed according to the methods described herein. In some examples, aspects of the operations of 1820 may be performed by a mapping identifying component as described with reference to FIGS. 9 through 12.

At 1825, the base station may decode the uplink control information based on the mapping. The operations of 1825 may be performed according to the methods described herein. In some examples, aspects of the operations of 1825 may be performed by a UCI decoding component as described with reference to FIGS. 9 through 12.

At 1830, the base station may decode the uplink random access message based on the uplink control information. The operations of 1830 may be performed according to the methods described herein. In some examples, aspects of the operations of 1830 may be performed by an uplink random access message decoding component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Example 1. A method for wireless communications, comprising: identifying a configuration for multiplexing uplink control information on an uplink random access message of a two-step random access procedure; generating the uplink random access message, the uplink random access message comprising a random access preamble and an associated uplink shared channel resource unit; identifying a trigger for inclusion of the uplink control information with the uplink random access message; multiplexing the uplink control information and a reference signal in the uplink shared channel resource unit based on the configuration; mapping the uplink control information to resource elements in the uplink shared channel resource unit based at least in part on a type of the uplink control information and a location of resource elements to which the reference signal is mapped; and transmitting the uplink random access message comprising the uplink control information to a base station.

Example 2: The method of example 1, further comprising: identifying a plurality of uplink control information parts of the uplink control information.

Example 3: The method of examples 1 or 2, wherein each type of the uplink control information is associated with a priority and wherein mapping the uplink control information further comprises: mapping the plurality of uplink control information parts to respective resource elements based at least in part on respective priorities of the plurality of uplink control information parts.

Example 4: The method of example 3, further comprising: mapping a first uplink control information part with a higher priority closer to resource elements to which the reference signal is mapped than a second uplink control information part with a lower priority.

Example 5: The method of any of examples 1 to 4, wherein each uplink control information part of the plurality of uplink control information parts comprises a different type of the uplink control information.

Example 6: The method of any of examples 1 to 5, further comprising: indicating a number of uplink control information parts in the plurality of uplink control information parts based at least in part on a preamble grouping for the random access preamble.

Example 7: The method of any of examples 1 to 6, further comprising: indicating a number of uplink control information parts in the plurality of uplink control information parts based at least in part on a demodulation reference signal (DMRS) grouping.

Example 8: The method of any of examples 1 to 7, further comprising: indicating a number of uplink control information parts in the plurality of uplink control information parts based at least in part on puncturing the uplink shared channel resource unit.

Example 9: The method of any of examples 1 to 8, further comprising: including, in a first uplink control information part, a pointer to a second uplink control information part, wherein a number of uplink control information parts in the plurality of uplink control information parts is indicated based at least in part on a number of pointers comprising at least the pointer.

Example 10: The method of any of examples 1 to 9, further comprising: identifying configuration information for mapping the uplink control information, the configuration information comprising a beta offset, formats for the uplink control information, a payload size, or any combination thereof.

Example 11: The method of example 10, further comprising: receiving an indication of the configuration information from the base station based at least in part on a Radio Resource Control (RRC) state of the UE, wherein the configuration information is identified based at least in part on receiving the indication.

Example 12: The method of example 11, wherein the indication is received in a system information block (SIB), an RRC message, or downlink control information.

Example 13: The method of any of examples 1 to 12, wherein the UE is in a Radio Resource Control (RRC) active mode, an RRC idle mode, or an RRC inactive mode.

Example 14: The method of any of examples 1 to 13, wherein the two-step random access procedure is a contention-free two-step random access procedure or a contention-based two-step random access procedure.

Example 15: The method of any of examples 1 to 14, wherein identifying the trigger further comprises: receiving a downlink control channel message from the base station, wherein the inclusion of uplink control information is based at least in part on receiving the downlink control channel message.

Example 16: The method of any of examples 1 to 15, wherein identifying the trigger further comprises: receiving a group common downlink control channel message from the base station, wherein the inclusion of uplink control information is based at least in part on receiving the group common downlink control channel message.

Example 17: The method of any of examples 1 to 16, wherein identifying the trigger further comprises: receiving Radio Resource Control (RRC) signaling from the base station, wherein the inclusion of uplink control information is based at least in part on receiving the RRC signaling.

Example 18: The method of any of examples 1 to 17, wherein identifying the trigger further comprises: determining the uplink random access message is a retransmission of an initial uplink random access message.

Example 19: The method of example 18, wherein the uplink control information comprises a redundancy version, a hybrid automatic repeat request (HARM) process identifier, or both.

Example 20: The method of any of examples 1 to 19, wherein identifying the trigger further comprises: identifying configured sets of resource unit sizes, modulation and coding schemes (MCS), transport block sizes (TBS), or any combination thereof; selecting a resource unit size, an MCS, and a TBS to use for the uplink random access message; and including an indicator of the selected resource unit size, the selected MCS, and the selected TBS in the uplink control information.

Example 21: The method of any of examples 1 to 20, wherein identifying the trigger further comprises: identifying a configured set of random access occasions; selecting a random access occasion for transmitting the uplink random access message from the configured set of random access occasions, wherein the random access occasion is associated with a synchronization signal block (SSB) beam index; and including an indicator of the SSB beam index in the uplink control information.

Example 22: The method of any of examples 1 to 21, wherein identifying the trigger further comprises: identifying a configured set of random access preambles; selecting the random access preamble from the configured set of random access preambles, wherein the random access preamble is associated with a synchronization signal block (SSB) beam index; and including an indicator of the SSB beam index in the uplink control information.

Example 23: The method of any of examples 1 to 22, wherein identifying the trigger further comprises: performing a measurement on a downlink reference signal from the base station to obtain a downlink measurement; and including an indicator of the downlink measurement in the uplink control information.

Example 24: The method of any of examples 1 to 23, wherein the uplink control information comprises uplink shared channel configuration information, acknowledgment (ACK) or negative acknowledgment (NACK) feedback, a channel state information (CSI) report, a scheduling request, interference measurement information, positioning measurement information, reference signal received power (RSRP) measurement information, beam management information, or any combination thereof.

Example 25: The method of any of examples 1 to 24, wherein the uplink shared channel configuration information comprises modulation and coding scheme (MCS) information, a redundancy version, a transport block size (TBS), a new data indicator (NDI), a hybrid automatic repeat request (HARQ) process number, or any combination thereof.

Example 26: The method of any of examples 1 to 25, wherein the RSRP measurement information is from a serving cell, one or more neighboring cells, or any combination thereof.

Example 27: The method of any of examples 1 to 26, wherein the beam management information comprises a list of preferred beam indexes.

Example 28: The method of any of examples 1 to 27, wherein the beam management information comprises transmit beam switching information indicating a first transmit beam for the random access preamble and a second transmit beam for the uplink shared channel resource unit.

Example 29: The method of any of examples 1 to 28, wherein the uplink control information comprises acknowledgment (ACK) or negative acknowledgment (NACK) feedback, a channel state information (CSI) report, a scheduling request, or any combination thereof.

Example 30: The method of any of examples 1 to 29, further comprising: indicating that the uplink random access message comprises the uplink control information based at least in part on a preamble grouping for the random access preamble.

Example 31: The method of any of examples 1 to 30, further comprising: indicating that the uplink random access message comprises the uplink control information based at least in part on a demodulation reference signal (DMRS) grouping.

Example 32: The method of any of examples 1 to 31, further comprising: indicating that the uplink random access message comprises the uplink control information based at least in part on puncturing the uplink shared channel resource unit.

Example 33. A method for wireless communications at a base station, comprising: receiving an uplink random access message of a two-step random access procedure, the uplink random access message comprising a random access preamble and an associated uplink shared channel resource unit; identifying that uplink control information is included in the uplink random access message; identifying a mapping of the uplink control information to resource elements in the uplink shared channel resource unit based at least in part on a priority of the uplink control information and a location of resource elements to which a reference signal is mapped; decoding the uplink control information based at least in part on the mapping; and decoding the uplink random access message based at least in part on the uplink control information.

Example 34: The method of example 33, further comprising: identifying a plurality of uplink control information parts of the uplink control information.

Example 35: The method of example 34, further comprising: identifying a mapping of the plurality of uplink control information parts to respective resource elements based at least in part on respective priorities of the plurality of uplink control information parts.

Example 36: The method of example 35, further comprising: identifying that a first uplink control information part with a higher priority is mapped closer to resource elements to which the reference signal is mapped than a second uplink control information part with a lower priority.

Example 37: The method of example 36, further comprising: decoding the first uplink control information part with the higher priority based at least in part on the first uplink control information part being mapped closer to resource elements to which the reference signal is mapped.

Example 38: The method of example 34, wherein each uplink control information part of the plurality of uplink control information parts comprises a different type of the uplink control information.

Example 39: The method of example 34, further comprising: identifying a number of uplink control information parts in the plurality of uplink control information parts based at least in part on a preamble grouping for the random access preamble.

Example 40: The method of example 34, further comprising: identifying a number of uplink control information parts in the plurality of uplink control information parts based at least in part on a demodulation reference signal (DMRS) grouping.

Example 41: The method of example 34, further comprising: identifying a number of uplink control information parts in the plurality of uplink control information parts based at least in part on puncturing the uplink shared channel resource unit.

Example 42: The method of example 34, further comprising: identifying, in a first uplink control information part, a pointer to a second uplink control information part, wherein a number of uplink control information parts in the plurality of uplink control information parts is identified based at least in part on a number of pointers comprising at least the pointer.

Example 43: The method of any of examples 33, further comprising: determining configuration information for mapping the uplink control information, the configuration information comprising a beta offset, formats for the uplink control information, a payload size, or any combination thereof.

Example 44: The method of example 43, further comprising: transmitting an indication of the configuration information to the UE based at least in part on a Radio Resource Control (RRC) state of the UE, wherein the configuration information is identified based at least in part on receiving the indication.

Example 45: The method of example 44, wherein the indication is received in a system information block (SIB), an RRC message, or downlink control information.

Example 46: The method of any of examples 33, wherein the UE is in a Radio Resource Control (RRC) active mode, an RRC idle mode, or an RRC inactive mode.

Example 47: The method of any of examples 33, wherein the two-step random access procedure is a contention-free two-step random access procedure or a contention-based two-step random access procedure.

Example 48: The method of any of examples 33, wherein identifying that uplink control information is included in the uplink random access message further comprises: transmitting a downlink control channel message to the UE, wherein the downlink control channel message triggers the UE to include the uplink control information in the uplink random access message.

Example 49: The method of any of examples 33, wherein identifying that uplink control information is included in the uplink random access message further comprises: transmitting a group common downlink control channel message to the UE, wherein the group common downlink control channel message triggers the UE to include the uplink control information in the uplink random access message.

Example 50: The method of any of examples 33, wherein identifying that uplink control information is included in the uplink random access message further comprises: transmitting Radio Resource Control (RRC) signaling to the UE, wherein the RRC signaling triggers the UE to include the uplink control information in the uplink random access message.

Example 51: The method of any of examples 33, wherein identifying that uplink control information is included in the uplink random access message further comprises: determining the uplink random access message is a retransmission of an initial uplink random access message.

Example 52: The method of example 51, wherein the uplink control information comprises a redundancy version, a hybrid automatic repeat request (HARQ) process identifier, or both.

Example 53: The method of any of examples 33, wherein identifying that uplink control information is included in the uplink random access message further comprises: identifying configured sets of resource unit sizes, modulation and coding schemes (MCS), transport block sizes (TBS), or any combination thereof; and identifying, from the UE, an indicator of a selected resource unit size, a selected MCS, and a selected TBS in the uplink control information.

Example 54: The method of any of examples 33, wherein identifying that uplink control information is included in the uplink random access message further comprises: identifying a configured set of random access occasions, wherein each random access occasion of the configured set of random access occasions is associated with a synchronization signal block (SSB) beam index; and identifying, from the UE, an indicator of an SSB beam index associated with a random access occasion of the configured set of random access occasions in the uplink control information.

Example 55: The method of any of examples 33, wherein identifying that uplink control information is included in the uplink random access message further comprises: identifying a configured set of random access preambles, wherein each random access preamble of the configured set of random access preambles is associated with a synchronization signal block (SSB) beam index; and identifying, from the UE, an indicator of an SSB beam index associated with the random access preamble in the uplink control information.

Example 56: The method of any of examples 33, wherein identifying that uplink control information is included in the uplink random access message further comprises: transmitting a downlink reference signal to the UE; and identifying an indicator of a downlink measurement for the downlink reference signal in the uplink control information.

Example 57: The method of any of examples 33, wherein the uplink control information comprises uplink shared channel configuration information, acknowledgment (ACK) or negative acknowledgment (NACK) feedback, a channel state information (CSI) report, a scheduling request, interference measurement information, positioning measurement information, reference signal received power (RSRP) measurement information, beam management information, or any combination thereof.

Example 58: The method of example 57, wherein the uplink shared channel configuration information comprises modulation and coding scheme (MCS) information, a redundancy version, a transport block size (TBS), a new data indicator (NDI), a hybrid automatic repeat request (HARD) process number, or any combination thereof.

Example 59: The method of example 57, wherein the RSRP measurement information is from the base station, one or more neighboring cells of the base station, or any combination thereof.

Example 60: The method of example 57, wherein the beam management information comprises a list of preferred beam indexes.

Example 61: The method of example 57, wherein the beam management information comprises transmit beam switching information indicating a first transmit beam for the random access preamble and a second transmit beam for the uplink shared channel resource unit.

Example 62: The method of any of examples 33, wherein the uplink control information comprises acknowledgment (ACK) or negative acknowledgment (NACK) feedback, a channel state information (CSI) report, a scheduling request, or any combination thereof.

Example 63: The method of any of examples 33, wherein the identifying that uplink control information is included in the uplink random access message is based at least in part on a preamble grouping for the random access preamble.

Example 64: The method of any of examples 33, wherein the identifying that uplink control information is included in the uplink random access message is based at least in part on a demodulation reference signal (DMRS) grouping.

Example 65: The method of any of examples 33, wherein the identifying that uplink control information is included in the uplink random access message is based at least in part on puncturing the uplink shared channel resource unit.

Example 66: An apparatus comprising at least one means for performing a method of any of examples 1 to 32.

Example 67: An apparatus for wireless communications comprising a processor; memory in electronic communication with the processor; and instructions stored in the memory and executable by the processor to cause the apparatus to perform a method of any of examples 1 to 32.

Example 68: A non-transitory computer-readable medium storing code for wireless communications, the code comprising instructions executable by a processor to perform a method of any of examples 1 to 32.

Example 69: An apparatus comprising at least one means for performing a method of any of examples 33 to 65.

Example 70: An apparatus for wireless communications comprising a processor; memory in electronic communication with the processor; and instructions stored in the memory and executable by the processor to cause the apparatus to perform a method of any of examples 33 to 65.

Example 71: A non-transitory computer-readable medium storing code for wireless communications, the code comprising instructions executable by a processor to perform a method of any of examples 33 to 65.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   identifying a configuration for multiplexing uplink control information on an uplink random access message of a two-step random access procedure;
   generating the uplink random access message, the uplink random access message comprising a random access preamble and an associated uplink shared channel resource unit;
   identifying a trigger for inclusion of the uplink control information with the uplink random access message;
   multiplexing the uplink control information and a reference signal in the uplink shared channel resource unit based on the configuration;
   mapping the uplink control information to resource elements in the uplink shared channel resource unit based at least in part on a type of the uplink control information and a location of resource elements to which the reference signal is mapped, wherein at least some different types of uplink control information are mapped to different resource elements; and
   transmitting the uplink random access message comprising the uplink control information to a base station.

2. The method of claim 1, further comprising:
   identifying a plurality of uplink control information parts of the uplink control information.

3. The method of claim 2, wherein each type of the uplink control information is associated with a priority and wherein mapping the uplink control information further comprises:
   mapping the plurality of uplink control information parts to respective resource elements based at least in part on respective priorities of the plurality of uplink control information parts.

4. The method of claim 3, further comprising:
   mapping a first uplink control information part with a higher priority closer to resource elements to which the reference signal is mapped than a second uplink control information part with a lower priority.

5. The method of claim 2, wherein each uplink control information part of the plurality of uplink control information parts comprises a different priority of the uplink control information.

6. The method of claim 2, further comprising:
   indicating a number of uplink control information parts in the plurality of uplink control information parts based at least in part on a preamble grouping of the random access preamble.

7. The method of claim 2, further comprising:
   indicating a number of uplink control information parts in the plurality of uplink control information parts based at least in part on a demodulation reference signal (DMRS) grouping.

8. The method of claim 2, further comprising:
   indicating a number of uplink control information parts in the plurality of uplink control information parts based at least in part on puncturing the uplink shared channel resource unit.

9. The method of claim 2, further comprising:
   including, in a first uplink control information part, a pointer to a second uplink control information part, wherein a number of uplink control information parts in the plurality of uplink control information parts is indicated based at least in part on a number of pointers comprising at least the pointer.

10. The method of claim 1, further comprising:
    identifying configuration information for mapping the uplink control information, the configuration information comprising beta offset information, one or more formats for the uplink control information, a payload size, or any combination thereof.

11. The method of claim 10, further comprising:
    receiving an indication of the configuration information from the base station, wherein the configuration information is identified based at least in part on a Radio Resource Control (RRC) state of a UE transmitting the uplink random access message, and wherein the indication is received in a system information block (SIB), an RRC message, or downlink control information.

12. The method of claim 1, wherein the two-step random access procedure is a contention-free two-step random access procedure or a contention-based two-step random access procedure.

13. The method of claim 1, wherein identifying the trigger further comprises:
    receiving a group common downlink control channel message from the base station, wherein the inclusion of uplink control information is based at least in part on receiving the group common downlink control channel message.

14. The method of claim 1, wherein identifying the trigger further comprises:
    receiving Radio Resource Control (RRC) signaling from the base station, wherein the inclusion of uplink control information is based at least in part on receiving the RRC signaling.

15. The method of claim 1, wherein identifying the trigger further comprises:
    determining the uplink random access message is a retransmission of an initial uplink random access message.

16. The method of claim 15, wherein the uplink control information comprises a redundancy version, a hybrid automatic repeat request (HARM) process identifier, or both.

17. The method of claim 1, wherein identifying the trigger further comprises:

identifying configured sets of resource unit sizes, modulation and coding schemes (MCS), transport block sizes (TBS), or any combination thereof;

selecting a resource unit size, an MCS, and a TBS to use for the uplink random access message; and including an indicator of the selected resource unit size, the selected MCS, and the selected TBS in the uplink control information.

18. The method of claim 1, wherein identifying the trigger further comprises:

identifying a configured set of random access occasions;

selecting a random access occasion for transmitting the uplink random access message from the configured set of random access occasions, wherein the random access occasion is associated with a synchronization signal block (SSB) beam index; and including an indicator of the SSB beam index in the uplink control information.

19. The method of claim 1, wherein identifying the trigger further comprises:

identifying a configured set of random access preambles;

selecting the random access preamble from the configured set of random access preambles, wherein the random access preamble is associated with a synchronization signal block (SSB) beam index; and including an indicator of the SSB beam index in the uplink control information.

20. The method of claim 1, wherein identifying the trigger further comprises:

performing a measurement on a downlink reference signal from the base station to obtain a downlink measurement; and including an indicator of the downlink measurement in the uplink control information.

21. The method of claim 1, wherein the uplink control information comprises uplink shared channel information, acknowledgment (ACK) or negative acknowledgment (NACK) feedback, a channel state information (CSI) report, a scheduling request, interference measurement information, positioning measurement information, reference signal received power (RSRP) measurement information for a serving cell or one or more neighboring cells, beam management information, or any combination thereof.

22. The method of claim 21, wherein the uplink shared channel information comprises modulation and coding scheme (MCS) information, a redundancy version, a transport block size (TBS), a new data indicator (NDI), a hybrid automatic repeat request (HARQ) process number, or any combination thereof.

23. The method of claim 21, wherein the beam management information comprises a list of preferred beam indexes or transmit beam switching information, or both, the transmit beam switching information indicating a first transmit beam for the random access preamble and a second transmit beam for the uplink shared channel resource unit.

24. The method of claim 1, wherein the uplink control information comprises acknowledgment (ACK) or negative acknowledgment (NACK) feedback, a channel state information (CSI) report, a scheduling request, or any combination thereof.

25. The method of claim 1, further comprising:

indicating that the uplink random access message comprises the uplink control information based at least in part on a preamble grouping of the random access preamble.

26. The method of claim 1, further comprising:

indicating that the uplink random access message comprises the uplink control information based at least in part on a demodulation reference signal (DMRS) grouping.

27. The method of claim 1, further comprising:

indicating that the uplink random access message comprises the uplink control information based at least in part on a puncturing of the uplink shared channel resource unit.

28. An apparatus for wireless communications, comprising:

a processor, memory coupled with the processor; and instructions stored in the memory and executable by the processor to cause the apparatus to:

identify a configuration for multiplexing uplink control information on an uplink random access message of a two-step random access procedure;

generate the uplink random access message, the uplink random access message comprising a random access preamble and an uplink shared channel resource unit;

identify a trigger for inclusion of the uplink control information with the uplink random access message;

multiplex the uplink control information and a reference signal with the uplink shared channel resource unit;

map the uplink control information to resource elements in the uplink shared channel resource unit based at least in part on a priority of the uplink control information and a location of resource elements to which the reference signal is mapped, wherein at least some different types of uplink control information are mapped to different resource elements; and transmit the uplink random access message comprising the uplink control information to a base station.

29. An apparatus for wireless communications, comprising:

means for identifying a configuration for multiplexing uplink control information on an uplink random access message of a two-step random access procedure;

means for generating the uplink random access message, the uplink random access message comprising a random access preamble and an associated uplink shared channel resource unit;

means for identifying a trigger for inclusion of the uplink control information with the uplink random access message;

means for multiplexing the uplink control information and a reference signal in the uplink shared channel resource unit based on the configuration;

means for mapping the uplink control information to resource elements in the uplink shared channel resource unit based at least in part on a type of the uplink control information and a location of resource elements to which the reference signal is mapped, wherein at least some different types of uplink control information are mapped to different resource elements; and means for transmitting the uplink random access message comprising the uplink control information to a base station.

30. A non-transitory computer-readable medium storing code for wireless communications, the code comprising instructions executable by a processor to:

identifying a configuration for multiplexing uplink control information on an uplink random access message of a two-step random access procedure;
generate the uplink random access message, the uplink random access message comprising a random access preamble and an associated uplink shared channel resource unit;
identify a trigger for inclusion of the uplink control information with the uplink random access message;
multiplex the uplink control information and a reference signal in the uplink shared channel resource unit based on the configuration;
map the uplink control information to resource elements in the uplink shared channel resource unit based at least in part on a type of the uplink control information and a location of resource elements to which the reference signal is mapped, wherein at least some different types of uplink control information are mapped to different resource elements; and
transmit the uplink random access message comprising the uplink control information to a base station.

* * * * *